United States Patent
Park

(10) Patent No.: US 9,802,622 B2
(45) Date of Patent: Oct. 31, 2017

(54) DRIVER ASSISTANCE APPARATUS AND VEHICLE INCLUDING THE SAME

(71) Applicant: LG ELECTRONICS INC., Seoul (KR)

(72) Inventor: Sangha Park, Seoul (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 15/017,723

(22) Filed: Feb. 8, 2016

(65) Prior Publication Data

US 2017/0001650 A1 Jan. 5, 2017

(30) Foreign Application Priority Data

Jul. 3, 2015 (KR) .................. 10-2015-0095437

(51) Int. Cl.
| | |
|---|---|
| *G06F 7/00* | (2006.01) |
| *B60W 50/08* | (2012.01) |
| *B60K 35/00* | (2006.01) |
| *B60W 50/10* | (2012.01) |

(52) U.S. Cl.
CPC ............ *B60W 50/08* (2013.01); *B60K 35/00* (2013.01); *B60W 50/10* (2013.01); *B60K 2350/1096* (2013.01); *B60K 2350/2052* (2013.01)

(58) Field of Classification Search
CPC ....... B60W 50/08; B60W 50/10; B60K 35/00; B60K 2350/1096; B60K 2350/2052
See application file for complete search history.

(56) References Cited

U.S. PATENT DOCUMENTS

| | | | |
|---|---|---|---|
| 9,229,450 B2 | 1/2016 | Oshima et al. | |
| 9,304,513 B2 | 4/2016 | Ichikawa et al. | |
| 2001/0013825 A1* | 8/2001 | DeLine ................. | B60K 35/00 340/425.5 |
| 2013/0110343 A1 | 5/2013 | Ichikawa et al. | |
| 2014/0095009 A1 | 4/2014 | Oshima et al. | |
| 2015/0367861 A1* | 12/2015 | Mori ..................... | B60W 50/14 701/1 |
| 2016/0077688 A1* | 3/2016 | Shim ..................... | G06F 3/0482 715/771 |

(Continued)

FOREIGN PATENT DOCUMENTS

| | | |
|---|---|---|
| JP | 06195595 | 7/1994 |
| JP | H11020499 | 1/1999 |
| JP | 2005300419 | 10/2005 |

(Continued)

*Primary Examiner* — Ian Jen
(74) *Attorney, Agent, or Firm* — Fish & Richardson P.C.

(57) ABSTRACT

A driver assistance apparatus for a vehicle having a self-driving function, and a vehicle including the same, are disclosed. The driver assistance apparatus includes a processor configured to determine at least one of navigation information, image information, or sensor information for the vehicle, and detects a driving state of the vehicle based on the at least one of navigation information, image information, or sensor information. The processor further determines a self-driving function or a safety and convenience function of the vehicle that is appropriate for the detected driving state of the vehicle. A display unit is configured to display the self-driving function or the safety and convenience function that is determined to be appropriate for the driving state of the vehicle.

31 Claims, 26 Drawing Sheets

(56) References Cited

U.S. PATENT DOCUMENTS

2016/0170410 A1    6/2016    Ichikawa et al.

FOREIGN PATENT DOCUMENTS

| JP | 2011162132    | 8/2011  |
| JP | 2013206156    | 10/2013 |
| JP |    5382218    | 1/2014  |
| JP | 2014046748    | 3/2014  |
| JP | 2015024746    | 2/2015  |
| JP | 2015072651    | 4/2015  |
| KR | 10-2004-0091788 | 11/2004 |
| KR | 10-2013-0091907 | 8/2013  |
| KR | 10-2014-0084962 | 7/2014  |
| KR | 10-2015-0056322 | 5/2015  |
| KR |    101525203   | 6/2015  |
| KR | 10-2015-0074873 | 7/2015  |
| WO | 2012164691    | 7/2014  |

* cited by examiner

181

183

DRIVER ASSISTANCE APPARATUS AND VEHICLE INCLUDING THE SAME

CROSS-REFERENCE TO RELATED APPLICATIONS

The present application claims the benefit of an earlier filing date and right of priority under 35 U.S.C. 119 and 35 U.S.C. 365 to Korean Patent Application No. 10-2015-0095437 filed on Jul. 3, 2015, which is hereby incorporated by reference in its entirety.

TECHNICAL FIELD

The present disclosure relates to a driver assistance apparatus for a vehicle.

BACKGROUND

A vehicle is an apparatus that moves a user in a direction in which he or she wants to go. A common example of a vehicle is a car.

For the convenience of a user who uses a vehicle, various sensors and electronic devices are typically included in the vehicle. In particular, various apparatuses for the driving convenience of a user are being developed. With an increase in recent interest in self-driving vehicles, research on sensors for self-driving vehicles has been actively conducted. Sensors in self-driving vehicles include, as examples, a camera, an infrared sensor, a radar, a Global Positioning System (GPS), a Lidar, a gyroscope, etc. In particular, a camera may perform important functions as a sensor to detect objects or environmental conditions around a vehicle.

SUMMARY

Systems and techniques are disclosed that provide a driver assistance apparatus, and a vehicle including the same, that determines appropriate convenience/safety functions to propose to a driver based on a detected driving state of the vehicle, and enables the user to easily execute the functions.

In one aspect, a driver assistance apparatus for a vehicle having a self-driving function is disclosed. The driver assistance apparatus includes a processor configured to determine at least one of navigation information, image information, or sensor information for the vehicle; detect a driving state of the vehicle based on the determined at least one of navigation information, image information, or sensor information; and determine a self-driving function of the vehicle that is appropriate for the detected driving state of the vehicle. The driver assistance apparatus also includes a display unit configured to display the self-driving function that is determined to be appropriate for the detected driving state of the vehicle.

In some implementations, the processor is configured to determine navigation information and sensor information for the vehicle, and detect the driving state of the vehicle based on the navigation information and the sensor information. The navigation information includes at least one of vehicle driving related map information, position information, set destination information, or route information according to the destination. The sensor information includes at least one of direction information, position information, speed information, acceleration information, tilt information, forward/backward movement information, fuel information, or lamp information for the vehicle. The driver assistance apparatus further includes an interface unit configured to receive the navigation information and the sensor information.

In some implementations, the processor is configured to further determine image information, and detect the driving state of the vehicle further based on the image information. The image information includes an image of at least one of a view in front of the vehicle or a view around the vehicle. The driver assistance apparatus further includes at least one camera configured to capture the image of the at least one of a view in front of the vehicle or a view around the vehicle. The processor is configured to acquire the image information based on the captured image by processing the captured image to detect at least one of a signal light, a sign, or a road surface as the image information.

In some implementations, the display unit is configured to display an icon corresponding to the determined self-driving function.

In some implementations, the display unit comprises a head-up display of a windshield and is configured to display the icon as an augmented reality image that corresponds to an image projected on the windshield.

In some implementations, the driver assistance apparatus further includes an input unit configured to receive, from a user, an input that selects the self-driving function, an input that executes the self-driving function, and an input that cancels the self-driving function.

In some implementations, the input unit is a steering wheel configured to recognize a swiping gesture input and a twisting gesture input of the user.

In some implementations, the driver assistance apparatus further includes an audio output unit configured to output a sound that corresponds to the self-driving function based on a determination that the input that selects the self-driving function is received by the input unit.

In some implementations, the display unit is configured to display a text that corresponds to the self-driving function based on a determination that the input that selects the self-driving function is received by the input unit.

In some implementations, the processor is further configured to determine, based on the position information or the image information, that the vehicle approaches an express lane of a tollgate; and determine the self-driving function as being a self-driving function for passing through the express lane of the tollgate. The display unit is further configured to display the self-driving function as being the self-driving function for passing through the express lane of the tollgate.

In some implementations, the driver assistance apparatus further includes an input unit configured to receive, from a user, an input that selects the self-driving function, an input that executes the self-driving function, and an input that cancels the self-driving function. The processor is further configured to receive, from the input unit, a self-driving function execution input signal for passing through the express lane of the tollgate; and perform, based on receiving the self-driving function execution input signal for passing through the express lane of the tollgate, a control function for the vehicle to perform self-driving until the vehicle passes through the express lane of the tollgate.

In some implementations, the processor is configured to determine, based on the position information or the image information, that the vehicle approaches a ramp way; and determine the self-driving function as being a self-driving function for passing through the ramp way. The display unit is further configured to display the self-driving function as being the self-driving function for passing through the ramp way.

In some implementations, the driver assistance apparatus further includes an input unit configured to receive, from a user, an input that selects the self-driving function, an input that executes the self-driving function, and an input that cancels the self-driving function. The processor is further configured to receive, from the input unit, a self-driving function execution input signal for passing through the ramp way; and perform, based on receiving the self-driving function execution input signal for passing through the ramp way, a control function for the vehicle to perform self-driving until the vehicle passes through the ramp way.

In some implementations, the processor is further configured to determine, based on the position information or the image information, that the vehicle approaches a service area; and determine the self-driving function as being a self-driving function for the vehicle to enter the service area. The display unit is further configured to display the self-driving function as being the self-driving function for entering the service area.

In some implementations, the driver assistance apparatus further includes an input unit configured to receive, from a user, an input that selects the self-driving function, an input that executes the self-driving function, and an input that cancels the self-driving function. The processor is further configured to receive, from the input unit, a self-driving function execution input signal for entering the service area; and perform, based on receiving the self-driving function execution input signal for entering the service area, a control function for the vehicle to perform self-driving until the vehicle arrives at the service area.

In some implementations, the processor is configured to determine, based on the position information or the image information, that the vehicle approaches or enters a section of a road in which self-driving is permitted; and determine the self-driving function as being a self-driving function for the vehicle to perform self-driving in the section of the road in which self-driving is permitted. The display unit is further configured to display the self-driving function as being the self-driving function for the vehicle to perform self-driving in the section of the road in which self-driving is permitted.

In some implementations, the driver assistance apparatus further includes an input unit configured to receive, from a user, an input that selects the self-driving function, an input that executes the self-driving function, and an input that cancels the self-driving function. The processor is further configured to receive, from the input unit, a self-driving function execution input signal for the section of the road in which self-driving is permitted; and perform, based on receiving the self-driving function execution input signal for the section of the road in which self-driving is permitted, a control function for the vehicle to perform self-driving in the section of the road in which self-driving is permitted.

In some implementations, the processor is further configured to determine, based on the position information and the image information, that the vehicle is in a U-turn lane or determine, based on the position information, that the vehicle approaches a U-turn lane along a navigation route; and determine, based on either the determination that the vehicle is in the U-turn lane or the determination that the vehicle approaches the U-turn lane along the navigation route, the self-driving function as being a U-turn self-driving function for performing self-driving until the vehicle completes a U-turn. The display unit is further configured to display the self-driving function as being the U-turn self-driving function.

In some implementations, the driver assistance apparatus further includes an input unit configured to receive, from a user, an input that selects the self-driving function, an input that executes the self-driving function, and an input that cancels the self-driving function. The processor is further configured to receive, from the input unit, a U-turn self-driving function execution input signal; and perform, based on receiving the U-turn self-driving function execution input signal, a control function for the vehicle to perform self-driving until the vehicle has completed the U-turn.

In some implementations, the processor is configured to determine, based on the position information and the image information, that the vehicle approaches an intersection; and determine the self-driving function as being a self-driving function for passing through the intersection according to route information. The display unit is further configured to display the self-driving function as being the self-driving function of passing through the intersection according to the route information.

In some implementations, the driver assistance apparatus further includes an input unit configured to receive, from a user, an input that selects the self-driving function, an input that executes the self-driving function, and an input that cancels the self-driving function. The processor is further configured to receive, from the input unit, a self-driving function execution input signal for passing through the intersection; and perform, based on receiving the self-driving function execution input signal for passing through the intersection, a control function for the vehicle to perform self-driving until the vehicle passes through the intersection.

In some implementations, the driver assistance apparatus further includes a communication unit configured to receive signal light change information from an external server. The processor is configured to determine, based on the image information and the signal light change information, the self-driving function as being a self-driving function for passing through a signal light. The display unit is configured to display the self-driving function of passing through the signal light.

In some implementations, the processor is further configured to determine, based on the position information and the image information, that the vehicle is travelling on a narrow road; and determine the self-driving function as being a narrow road self-driving function for performing self-driving until the vehicle is out of the narrow road. The display unit is configured to display the self-driving function as being the narrow road self-driving function.

In some implementations, the processor is further configured to determine, based on the position information and the image information, that the vehicle enters a parking lot; and determine the self-driving function as being a parking self-driving function for automatically parking the vehicle. The display unit is configured to display the self-driving function as being the parking self-driving function.

In some implementations, the processor is further configured to determine, based on the sensor information, that a turn signal has been input; and determine the self-driving function as being a lane change self-driving function for moving the vehicle according to the turn signal. The display unit is configured to display the self-driving function as being the lane change self-driving function.

In some implementations, the processor is configured to determine, based on the image information, that a second vehicle travels in front of the vehicle for a preset duration of time; and determine, based on the determination that the second vehicle travels in front of the vehicle for the preset duration of time, the self-driving function as being an overtaking self-driving function for performing self-driving until the vehicle overtakes the second vehicle. The display unit is further configured to display the self-driving function as being the overtaking self-driving function.

In some implementations, the processor is further configured to determine driving history information stored in a memory; determine, based on the driving history information, a location in the driving history information that is associated with the user; detect that the vehicle travels within a threshold distance of the determined location in the driving history information that is associated with the user; and determine, based on detecting that the vehicle travels within a threshold distance of the location in the driving history information associated with the user, the self-driving function as being an automatic-parking self-driving function. The display unit is configured to display the self-driving function as being an automatic-parking self-driving function.

In some implementations, the input unit comprises at least one of an audio input unit configured to receive a user input made with sound, or a touch screen of a mobile terminal.

In another aspect, a driver assistance apparatus includes a processor configured to determine at least one of navigation information, image information, or sensor information; detect a driving state of a vehicle based on the determined at least one of the navigation information, the image information, or the sensor information; and determine a convenience and safety function of the vehicle that is appropriate for the determined driving state of the vehicle. The driver assistance apparatus also includes a display unit configured to display the convenience and safety function that is determined to be appropriate for the detected driving state of the vehicle.

In another aspect, a vehicle includes a driver assistance apparatus according to one or more implementations as described above.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

DETAILED DESCRIPTION

Figure 1:
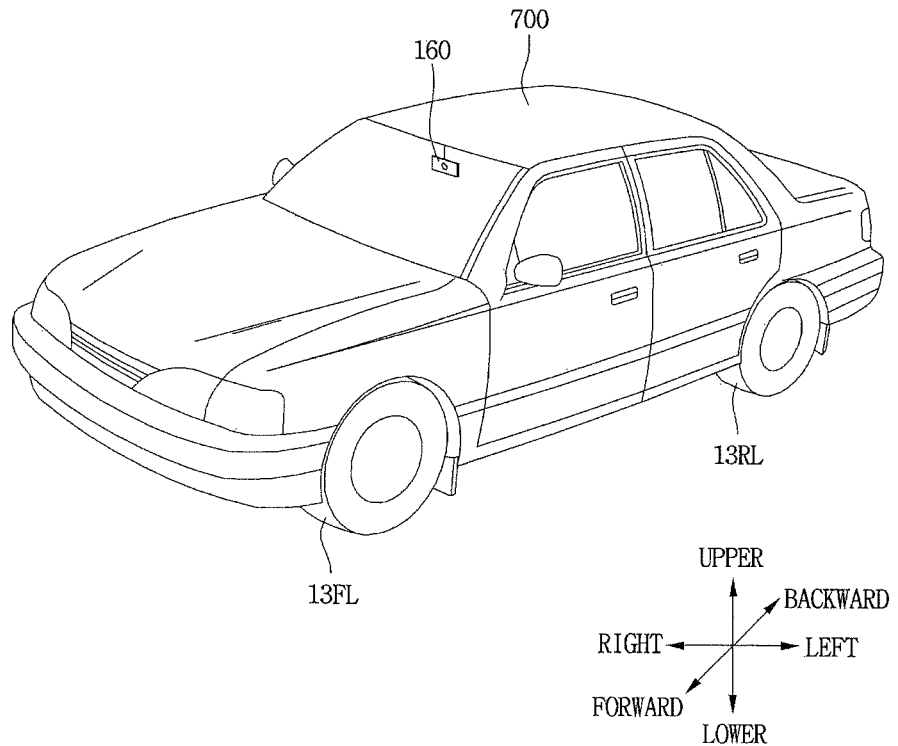
FIG. 1 is a diagram showing an example of an exterior of a vehicle that includes a driver assistance apparatus.

A self-driving vehicle may be equipped with one or more self-driving functions and/or safety/convenience functions that utilize sensors and other electronic devices. However, in such cases, a user may not be familiar with such self-driving functions or safety/convenience functions. For example, a user may not know what a self-driving or safety/convenience function indicates, or how to execute such functions, or in what scenarios such functions should be executed, etc.

As a result, various functions in a vehicle may be underutilized or mistakenly utilized by a user. In addition, in some scenarios, a driver's attention may be distracted and impose difficulties for the user to operate such functions, in which case there may be am increased risk of accidents.

As such, even if a vehicle is equipped with driver-convenience functions, there may be a limitation in that a driver may have difficulty in using these functions.

Implementations disclosed herein enable a driver assistance apparatus to automatically detect a driving state of a vehicle and/or conditions around the vehicle, and determine an appropriate self-driving function and/or safety/convenience function to recommend to a driver of the vehicle. In some cases, this may enable a driver to more easily execute the self-driving functions and/or the safety/convenience functions of the vehicle. This may also help the driver maintain driving attention and enable the vehicle to perform self-driving and/or safety/convenience functions in driving situations in which the driver has difficulty driving. Such techniques may help improve safe driving and help improve driver convenience.

The driver assistance apparatus may enable a user to explicitly select whether or not to execute the recommended self-driving function and/or recommended safety/convenience function. As such, rather than automatically invoking a self-driving function and/or safety/convenience function in a particular scenario, the driver assistance apparatus may first display, to the user, a recommended self-driving function and/or safety/convenience function, and only execute that function if the user affirmatively selects the function.

Examples of self-driving functions include self-parking, passing through an express lane or a cash lane at a toll gate, driving into a service area, entering an on-ramp onto a highway, making a U-turn, entering or merging onto a road with traffic, passing through an intersection, changing lanes, overtaking another vehicle travelling in front of the vehicle, Self-driving functions may be implemented by automatically controlling various components of a vehicle, such as a steering input unit, a brake pedal, an accelerator pedal, etc.

Examples of safety/convenience functions include an idle stop and go (ISG) function, a route re-search function, and an auto-hold function, which may be used, for example, when the vehicle is stuck in a traffic jam. Other examples of safety/convenience functions include a hill start assist (HAS) function, a transparent bonnet function, and a four-wheel function, which may be used, for example, when the vehicle travels on an incline. Other examples of safety/convenience functions include a suspension function, a tire check function, and a road width information providing function, which may be used, for example, when the vehicle travels on a rough or unpaved road. Other examples of safety/convenience functions include an ECO function, a gas station search function, and a driving range providing function, which may be used, for example, when the vehicle is low on fuel. Other examples of safety/convenience functions include a cooling seat operation function, a sunroof open/close function, a sunlight blocking function, an infrared camera function, a lighting function, a windshield wiper function, and a sunroof open/close function, which may be used, for example, depending on whether the vehicle operates during daytime, nighttime, during rain, or in a tunnel.

Other examples of safety/convenience functions include an electronic stability control (ESC) function, a lane departure warning system (LDWS) function, a door unlocking function, a seat adjusting function, a door lock function, a parking assist system (PAS) function, an around view monitoring (AVM) function, an ultrasonic alarm function.

Although some examples of self-driving functions and safety/convenience functions have been described above, implementations are not limited thereto. In general, a driver assistance apparatus described in the present disclosure may determine that any suitable self-driving or safety/convenience function is appropriate for a detected driving state of a vehicle, and may recommend the self-driving function or safety/convenience function to a user of the vehicle based on the detected driving state of the vehicle.

A vehicle discussed in the present disclosure may include a car or motorcycle, but implementations are not limited thereto, and may generally include any suitable vehicle that is used for transportation. Hereinafter, a description will be given based on a car.

A vehicle discussed in the present disclosure may include a power source. The vehicle may be, for example, an internal combustion engine vehicle that includes an engine as a power source, or a hybrid vehicle that includes an engine and an electrical motor as a power source, or an electrical vehicle that includes an electrical motor as a power source. In general, a vehicle may be motorized by any suitable power source.

In the following description, the left side of the vehicle refers to the left side of the driving direction of the vehicle and the right side of the vehicle refers to the right side of the driving direction of the vehicle.

In the following description, a left hand drive (LHD) vehicle is mostly described unless mentioned to the contrary. A left-hand drive (LHD) vehicle refers to a vehicle in which a driver's seat is located at the left-hand side of the vehicle.

Figure 2:
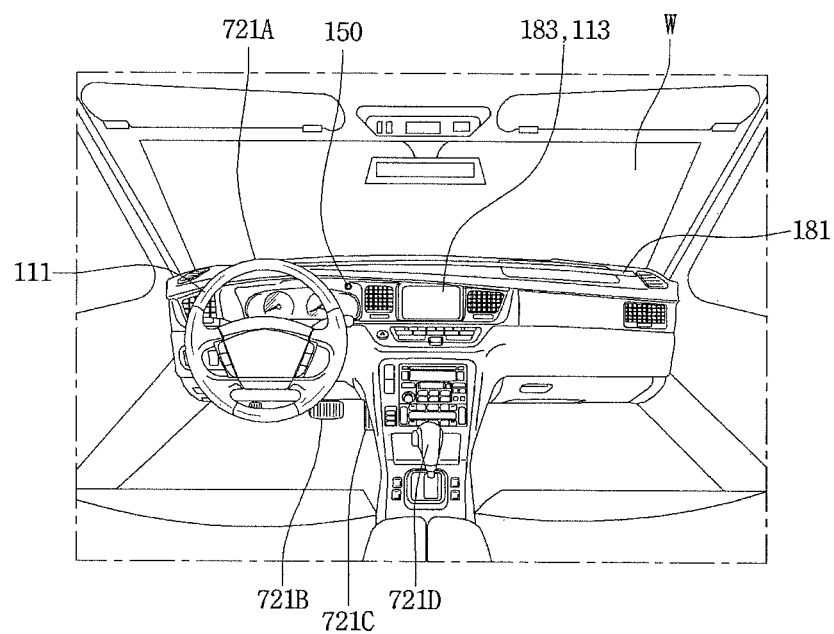
FIG. 2 is a diagram showing an example of an interior of a vehicle that includes a driver assistance apparatus.
Figure 3:
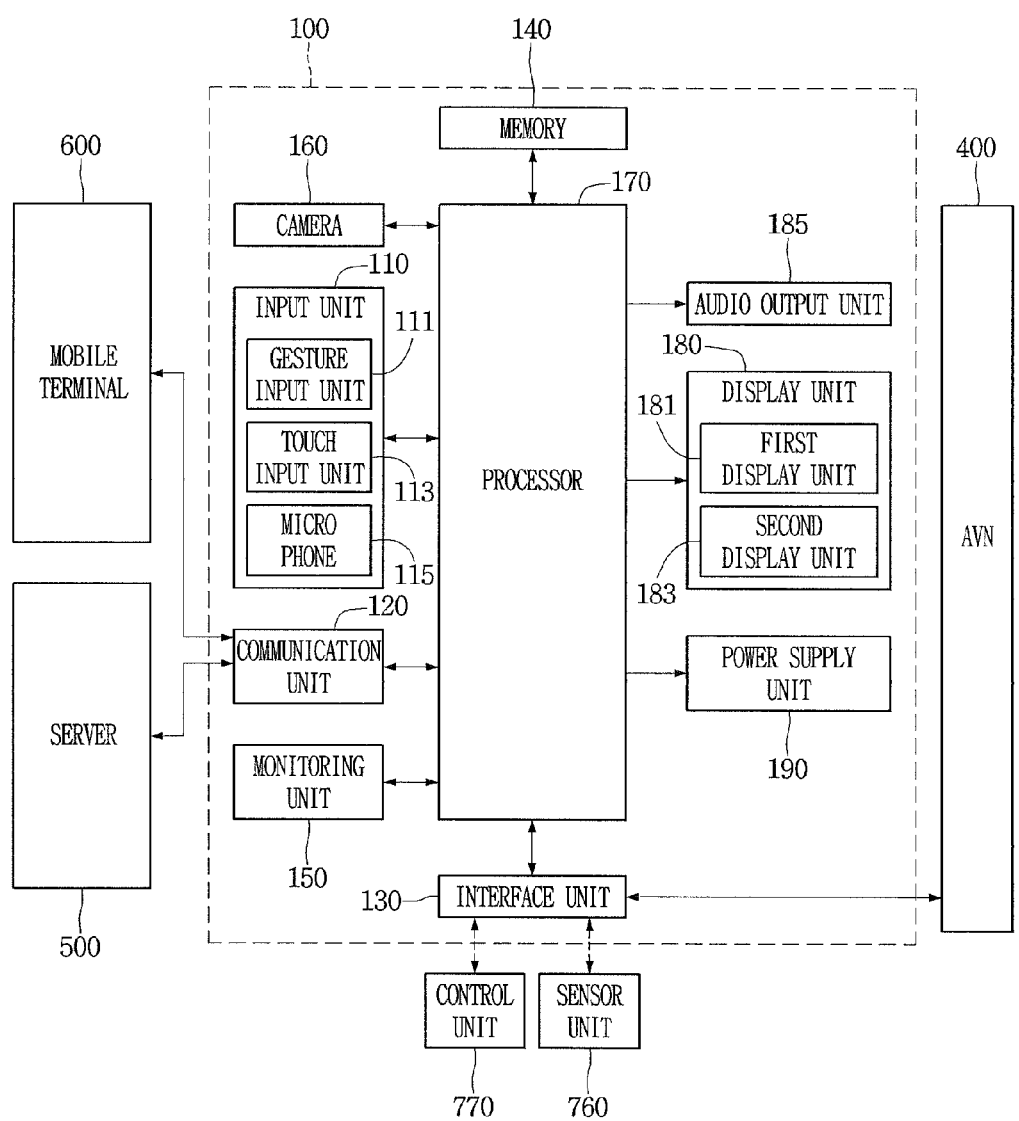
FIG. 3 is a block diagram illustrating an example of a driver assistance apparatus.
Figure 4:
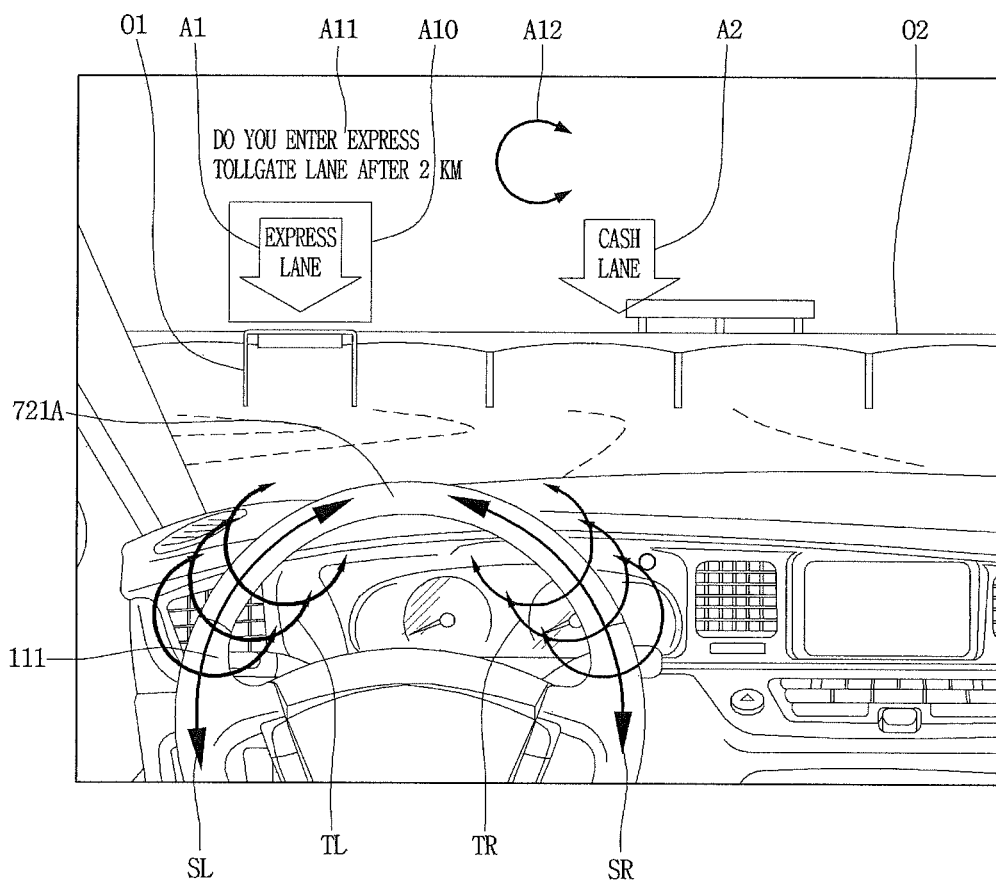
FIG. 4 is a diagram illustrating an example of a self-driving function.

FIG. 1 is a diagram showing the exterior of a vehicle that includes a driver assistance apparatus according to an implementation. FIG. 2 is a diagram showing the interior of a vehicle that includes a driver assistance apparatus according to an implementation. FIG. 3 represents a block diagram of a driver assistance apparatus according to an implementation. FIG. 4 illustrates when a driver assistance apparatus according to an implementation proposes a self-driving function.

Referring to FIGS. 1 to 3, a vehicle 700 may include wheels 13FL and 13FR that rotate by a power source, a driving manipulation unit 721 for controlling the driving of the vehicle 700, and a driver assistance apparatus 100.

The vehicle 700 described in the present disclosure is the vehicle 700 that may perform self-driving. A self-driving function may be executed by the direct control of the signal of an input unit of the vehicle 700 by the driver assistance apparatus 100. Alternatively, the self-driving function may also be autonomously performed in the vehicle 700 according to a request from the driver assistance apparatus 100.

In the following description, the driver assistance apparatus 100 receives information to determine the driving state of the vehicle 700, determines an appropriate self-driving function for the driving state of the vehicle 700, displays to a user the self-driving function that may be provided according to the driving state, and requests the vehicle 700 to execute the self-driving function according to a user selection.

Also, although the driver assistance apparatus 100 according to an implementation may be described to include units therein as shown in FIG. 3, it is also possible to use units in the vehicle 700 through an interface unit and the driver assistance apparatus may also be implemented by a combination of units in the vehicle 700.

Referring to FIGS. 1 to 3, such a driver assistance apparatus 100 may include an input unit 110, a communication unit 120, an interface unit 130, a memory 140, a monitoring unit 150, a camera 160, a processor 170, a display unit 180, an audio output unit 185, and a power supply unit 190.

Firstly, the driver assistance apparatus 100 may include the input unit 110 that senses a user input. A user may input through the input unit 110 whether to execute the self-driving function proposed by the driver assistance apparatus 100.

Such an input unit 110 may include at least one of a gesture input unit 111 that senses a user gesture, a touch input unit 113 that senses a touch, and a microphone 115 that senses a voice input.

Firstly, the gesture input unit 111 may be disposed on a steering input unit 721A of the vehicle 700 to sense a user gesture that a user makes at the steering input unit 721A.

Specifically, the gesture input unit 111 may be disposed on the surface of a steering wheel, the steering input unit 721A to identify and sense various hand motions made on the surface of the steering wheel.

For example, the gesture input unit 111 may sense a swiping motion that is a gesture of touching a first point to a second point of a surface of the steering wheel with the hands. Also, the gesture input unit 111 may sense a twisting motion that is made when a user holds and squeezes the surface of the steering wheel with his or her hands.

Since there is a high possibility that such a gesture is a motion that the user performs with a clear input intention.

Also, since the gesture input unit 111 senses various gesture inputs input by hands on the steering wheel during driving, the user may easily perform various execution inputs, maintaining driving attention.

The gesture input unit 113 may be disposed in the vehicle 700 to sense a user's touch input, and include a plurality of buttons, touch screens 183 and 113 on the display unit 180, and so on. Through a touch input, it is possible to receive an execution input of turning on/off the power source of the driver assistance apparatus 100, an input relating to whether to execute the proposed self-driving function, and so on.

Also, the microphone 115 may be disposed in the vehicle 700 to sense a user's voice input. Through a voice input, the user may perform an execution input of turning on/off the power source of the driver assistance apparatus 100, an input relating to whether to execute the proposed self-driving function, and so on.

Next, the driver assistance apparatus 100 may include a communication unit 120 that communicates with another vehicle 700, a mobile terminal 600 and a server 500. The driver assistance apparatus 100 may receive navigation information and/or traffic information through the communication unit 120 and the received information may be used for determining the driving state of the vehicle 700. In some implementations, the received information may also be used for self-driving functions.

Specifically, the communication unit 120 may exchange data with the mobile terminal 600 or the server 500 wirelessly. In particular, the communication unit 120 may wirelessly exchange data with the mobile terminal of a vehicle 700 driver. The wireless data communication scheme may include various data communication schemes such as Bluetooth, WiFi, Direct WiFi, APiX, or NFC.

The communication unit 120 may receive position information, weather information, or road traffic information, e.g., transport protocol expert group (TPEG) information, from the mobile terminal 600 or the server 500.

Also, the communication unit 120 may also receive navigation information from the mobile terminal 600, when the mobile terminal 600 is used as a navigation device. In this example, the navigation information may include at least one of map information relating to vehicle 700 driving, position information on the vehicle 700, preset destination information, and route information depending on a destination.

Also, when a user gets in the vehicle 700, the mobile terminal 600 of the user and the driver assistance apparatus 100 may also perform pairing automatically or by the execution of an application by the user.

Also, the communication unit 120 may receive traffic information such as a change of a traffic light from a server 500. In this example, the server 500 may be an external server that is located at a traffic control center controlling traffic, or server 500 may be a computer located in another vehicle.

Next, the driver assistance apparatus 100 may include the interface unit 130 that receives vehicle 700 related data or transmits a signal processed or generated by the processor 170 to the outside.

Specifically, the driver assistance apparatus 100 may receive navigation information and/or sensor information through the interface unit 130. In addition, the received information may be used for determining the driving state of the vehicle 700 and/or may be used for self-driving functions.

Also, the driver assistance apparatus 100 may transmit the execution input of a self-driving function to the control unit of the vehicle 700 through the interface unit 130.

To this end, the interface unit 130 may perform data communication with the control unit 770, an audio video navigation (AVN) apparatus 400, the sensor unit 760, and so on through wired or wireless communication.

The interface unit 130 may receive navigation information by data communication with the control unit 770, the AVN apparatus 400 and or a separate navigation apparatus.

Also, the interface unit 130 may receive sensor information from the control unit 770 or the sensor unit 760.

In this example, the sensor information may include at least one of direction information on the vehicle 700, position information, speed information, acceleration information, tilt information, forward/backward movement information, fuel information and turn signal information.

Also, the sensor information may be acquired from a heading sensor, a yaw sensor, a gyro sensor, a position module, a vehicle 700 forward/backward movement sensor, a wheel sensor, a vehicle 700 speed sensor, a vehicle tilt sensor, a battery sensor, a fuel sensor, a tire sensor, a steering sensor by steering wheel rotation, a vehicle 700 temperature sensor, and a vehicle 700 humidity sensor. The position module may include a GPS module for the reception of GPS information.

The interface unit 130 may receive a user input that is received through the user input unit 110 of the vehicle 700. The interface unit 130 may receive the user input from the input unit 110 or 720 of the vehicle 700 or through the control unit 770. That is, when the input unit 110 is disposed as a component in the vehicle 700, it is possible to receive the user input through the interface unit 130.

The interface unit 130 may also receive traffic information acquired from the server 500. The server 500 may be an external server that is located at a traffic control center controlling traffic, or server 500 may be a computer located in another vehicle. For example, when the traffic information is received from the server through the communication unit 120, the interface unit 130 may also receive the traffic information from the control unit 770.

Next, the memory 140 may store various pieces of data for the overall operations of the driver assistance apparatus 100, such as programs for processing or control by the processor 170.

Specifically, the memory 140 may store data for object verification. For example, when a predetermined object is detected from an image acquired by the camera 160, the memory 140 may store data for verifying, by a predetermined algorithm, to which the object corresponds.

For example, the memory 140 may store data on traffic information as data for the object verification. For example, when predetermined traffic information is detected from an image acquired by the camera 160, the memory 140 may store data for checking, by a predetermined algorithm, to which the traffic information corresponds.

Also, the memory 140 may store a user's driving history. For example, the memory 140 may store, as driving history information, information regarding a home or a company or other location to which a user often drives. Such a location may be determined by various techniques, some examples of which include a location that is saved in memory, or a location at which the user has parked more than a threshold number of times, or a location at which the user has recently parked. Based on this determined location, which may be a home of the user as an example, the processor 170 may propose a self-driving function, such as auto parking, when the vehicle 700 is located near the home of the user according to the driving history information. For example, the processor 170 may determine that the vehicle 700 is located within a threshold distance of the home, and may propose a self-driving function, such as auto parking.

Also, the memory 140 may be various storage devices, such as a ROM, RAM, EPROM, flash drive, or hard drive that are hardware.

Next, the driver assistance apparatus 100 may include the monitoring unit that captures an image of the interior of the vehicle 700.

Specifically, the monitoring unit 150 may acquire an image of a passenger. The monitoring unit 150 may acquire an image for the biometrics of the passenger. That is, the monitoring unit 150 may be an image acquisition module that is disposed in the vehicle 700.

Such a monitoring unit 150 may capture an image of a user to acquire the image of the user. Thus, when the user makes a gesture, an image of the gesture may be captured by the monitoring unit 150. The user gesture captured in this way may be detected by the processor 170 to be used as a user input. That is, the monitoring unit 150 may also a user gesture input. Thus, the user may make a gesture to input whether to execute the proposed self-driving function.

Also, it is possible to analyze the image of the user acquired through the monitoring unit 150 to detect a line of sight of the user. In addition, the processor 170 may control the display unit 180 to display a projected image on the windshield W according to the detected line of sight.

Next, the driver assistance apparatus 100 may include the camera 160 that captures images of things in front of the vehicle 700 and/or images of things around the vehicle 700.

The camera 160 may capture images of things around the vehicle 700.

Specifically, the camera 160 may capture images of things in front of the vehicle 700 (hereinafter, referred to as 'front image') to acquire the front images, and the processor 170 may analyze an object in the front images to acquire image information.

For example, the images captured by the camera 160 may include objects, such as a tollgate sign, an express tollgate sign, a ramp sign, a self-driving permission sign, a U-turn sign, a signal light, a road width, and a lane. The processor 170 may process images of such objects to generate image information. For example, the image information may correspond to information that the objects in the captured image represent.

In some implementations, the camera 160 may be a stereo camera 160 that may enhance the measurement accuracy of an object and further obtain information, such as a distance between the vehicle 700 and the object.

The driver assistance apparatus 100 may recognize the driving state of the vehicle 700 through the image information acquired in this way, and propose a recommended self-driving function according to the driving state. For example, the driver assistance apparatus 100 may detect a time required by a user through the image information to propose a proper self-driving function.

In some implementations, the camera 160 may further include a plurality of cameras. In this case, the plurality of cameras 160 may be disposed at least one of the left, rear, right and front of the vehicle 700, respectively. The left camera 160 may be disposed in a casing that surrounds a left side mirror. Alternatively, the left camera 160 may be disposed outside the casing that surrounds the left side mirror. Alternatively, the left camera 160 may be disposed on a region outside a left front door, a left rear door or left fender.

The right camera 160 may be disposed in a casing that surrounds a right side mirror. Alternatively, the right camera 160 may be disposed outside the casing that surrounds the right side mirror. Alternatively, the right camera 160 may be disposed on a region outside a right front door, a right rear door or right fender.

Also, the rear camera 160 may be disposed near a rear number plate or trunk switch, or other location at the rear of the vehicle. The front camera 160 may be disposed near an emblem or radiator grill, or other location at the front of the vehicle.

As such, an image captured from at least one of the front, rear, side and right of the vehicle 700 may be stored.

In some implementations, the camera 160 may include an image sensor and an image processing module. The camera 160 may process a still image or video that is obtained by an image sensor (e.g., CMOS or CCD). The image processing module may process the still image or video acquired by the image sensor to extract information and transmit the extracted information to the processor 170.

The driver assistance apparatus 100 may include the display unit 180 displaying a self-driving function that may be provided.

Specifically, the display unit 180 may display, as an image, a self-driving function to be proposed to a user by the processor 170 so that the user may visually check the function.

In some implementations, such a display unit 180 may include a plurality of displays. For example, the display unit 180 may include a first display unit 181 that projects and displays an image onto the windshield of the vehicle 700. The first display unit 181 may include a projection module projecting an image onto the windshield W, as a head up display (HUD). In addition, if a projected image projected by the projection module has a predetermined transparency, a user may simultaneously see the projected image and a view of the outside of the vehicle behind the projected image.

The projected image displayed on such a first display unit 181 may overlap a reflected image reflected to the window shield W to implement augmented reality (AR). In this case, the projected image that represents a self-driving function proposed to a user matches a transparent image to be capable of intuitively relaying the user of the self-driving function.

For example, the first display unit 181 may display an icon disposed adjacent to an object obtained from image information and representing a self-driving function, in association with the object so that a user may intuitively recognize the details of the self-driving function.

As a specific example, the first display unit 181 may display an arrow and a marker selecting the arrow to match each of an express tollgate lane sign and a cash payment lane sign on the projected image. Thus, a user may easily understand that when he or she selects the arrow, a self-driving function of passing a selected lane by self-driving is performed.

The display unit 180 may enable the self-driving function to be intuitively understood with a simple display, and also enhance the safety of driving because the user may keep eyes forward.

The display unit 180 may include a second display unit 183 that is separately installed in the vehicle 700 and displays an image.

Specifically, the second display unit 183 may be the display of a vehicle 700 navigation apparatus or the front cluster inside the vehicle 700.

In some implementations, the second display unit 183 may include at least one of a liquid crystal display (LCD), a thin film transistor LCD (TFT LCD), an organic light-emitting diode (OLED), a flexible display, a 3D display, and an e-ink display.

Such a second display unit 183 may be coupled to the gesture input unit 113 to form a touch screen. Thus, when the self-driving function is displayed on the second display unit 183, the self-driving function may be executed by the touch of the second display unit 183.

Also, the driver assistance apparatus 100 may further include the audio output unit 185 and the power supply unit 190.

Specifically, the audio output unit 185 may output a description on the self-driving function, or a message checking whether to execute the function by using audio directions. The driver assistance apparatus 100 may supplement a description of the self-driving function through the audio direction of the audio output unit 185, in addition to a visual display through the display unit 180.

The driver assistance apparatus 100 may include the processor 170 that controls the overall operations of each unit in the driver assistance apparatus 100.

For example, the processor 170 may detect the driving state of the vehicle 700 from at least one of navigation information, image information and sensor information.

As a specific example, the processor 170 may detect, through route information and vehicle 700 position information in the navigation information, that the vehicle 700 has approached a particular road scenario, such as a tollgate, a service area, a ramp, a self-driving permission section, a U-turn lane, etc.

Also, the processor 170 may detect an object, such as a sign, from an image captured by the camera 160. The processor 170 may detect through image information acquired from the object, such as the sign, that the vehicle has approached the particular road scenario, such as the service area, the ramp, the self-driving permission section, the U-turn lane, etc.

Also, the processor 170 may detect, through vehicle 700 tilt information in the sensor information, that the user drives the vehicle on a hill. The processor 170 may also detect, through turn signal information, that there is a need to change a lane or perform left/right turn.

In addition, the processor 170 may extract a self-driving function that may be provided in such a driving state. In addition, when the self-driving function is extracted, the processor 170 may display it to propose to a user. For example, the processor 170 may provide a self-driving function recommended for the user in real-time according to acquired information, even without necessarily receiving a separate user request.

For example, the processor 170 may extract a self-driving function for passing an express tollgate lane by self-driving, and an automatic-driving function of passing a cash lane by self-driving, when the vehicle 700 has approached a tollgate.

In addition, the processor 170 may provide the extracted self-driving function to the user through the display unit 180 unit 180 and/or the audio output unit 185.

As a specific example, the processor 170 may enable an icon representing a self-driving function by a projected image to be popped up on the first display unit 181.

In this case, the processor 170 may detect a line of sight from an image of a user acquired through the monitoring unit 150. In addition, the processor 170 may detect an object relating to a self-driving function through the camera 160. In addition, the processor 170 may calculate the position and direction of a reflected image that matches an object according to the line of sight of the user. In addition, the processor 170 may control the first display unit 181 to display an icon matching an object.

Also, the processor 170 may receive an input relating to whether to execute a self-driving function, through the input unit 110, and perform a corresponding operation.

For example, when there is a self-driving function execution input proposed through the gesture input unit 111, the processor 170 may request the vehicle 700 to execute a corresponding self-driving function.

The processor 170 may be implemented by using at least one of an application specific integrated circuit (ASIC), a digital signal processor (DSP), a digital signal processing device (DSPD), a programmable logic device (PLD), a field programmable gate array (FPGA), the processor, a controller, a micro-controller), a microprocessor 170, and other electrical units for executing functions.

In addition, such a processor 170 may be controlled by the control unit or control various functions of the vehicle 700 through the control unit.

In the following, a process of providing, by the driver assistance apparatus 100 according to an implementation, a recommended self-driving function and receiving an input relating to whether to execute the function is described in more detail with reference to FIG. 4.

FIG. 4 represents how to propose a self-driving mode according to an implementation.

Referring to FIG. 4, the processor 170 may process an image captured by the camera 160 and detect an express tollgate sign as a first object O1 and a tollgate as a second object O2 to generate image information.

In addition, the processor 170 may control the first display unit 181 to display a first projected image A1 matching the first object O1 on the windshield W. For example, the first projected image A1 may be displayed so that an arrow indicates the express tollgate sign, thus a user may intuitively recognize that a proposed self-driving function has been recommended by the driver assistance apparatus for passing an express tollgate lane.

Also, the processor 170 may control the first display unit 181 to display a second projected image A2 matching the second object O2 on the windshield W. For example, the second projected image A2 may be displayed so that an arrow indicates the tollgate entrance, thus the user may intuitively recognize that a proposed self-driving function has been recommended by the driver assistance apparatus for passing the toll gate entrance indicated by the arrow.

In addition, the processor 170 may control the first display unit 181 to display the self-driving function selected by the user, with a marker A10. Such a marker A10 may be displayed to correspond to the projected image.

Also, when the self-driving function is selected, the processor 170 may notify the user of the details of the self-driving function and provide a method of inputting whether to execute the function. For example, the processor 170 may display the detail of the self-driving function on the marker A10 with text A11. Also, the processor 170 may output the detail of the self-driving function through sound from the audio output unit 185.

In addition, the processor 170 may enable a gesture input method A12 of executing the displayed self-driving function to be further displayed.

Specifically, in some implementations, a self-driving function execution input unit may be a gesture input unit 111 that is disposed at the steering input unit 721A. In addition, the processor 170 may sense a gesture sensed from the gesture input unit 111 and perform an operation corresponding to the sensed gesture.

For example, the gesture input unit 111 may sense a swiping motion SL, SR that is a gesture of touching, with a hand, from a first point of the surface of the steering wheel to a second point thereof. Also, the gesture input unit 111 may sense a twisting motion TL, TR that is made when a user holds and squeezes the surface of the steering wheel with his or her hands.

Specifically, when a gesture of fixing a left hand and then swiping a right hand clockwise is sensed through the gesture input unit 111, the processor 170 may perform an operation of executing self-driving matching a corresponding gesture. For example, the processor 170 may request the control unit of the vehicle 700 to execute the self-driving function of passing an express tollgate lane.

Also, the processor 170 may stop proposing a self-driving function when a gesture of fixing a right hand and then swiping a left hand clockwise is sensed. Also, the processor 170 may perform an execution input of selecting one of many self-driving functions relating to twisting.

The processor 170 may process an image acquired by the camera 160 to acquire information. As a particular example, the processor 170 may perform computer vision based signal processing. Thus, the processor 170 may acquire an image of an object in front of or around the vehicle 700 from the camera 160 and perform object detection and object tracking based on the image. In particular, when object detection is performed, the processor 170 may perform sign detection, land detection (LD), vehicle 700 detection (VD), pedestrian detection (PD), brightspot detection (BD), traffic sign recognition (TSR), road surface detection, and so on.

For example, the processor 170 may detect image information from an image of an object in front of or around the vehicle 700 that is acquired by the camera 160.

The processor 170 may compare the detected information with information stored in the memory 140 to check the information.

In the following, a method of detecting the processor 170 image information is described in more detail with reference to FIGS. 5 and 6.

Figure 5:
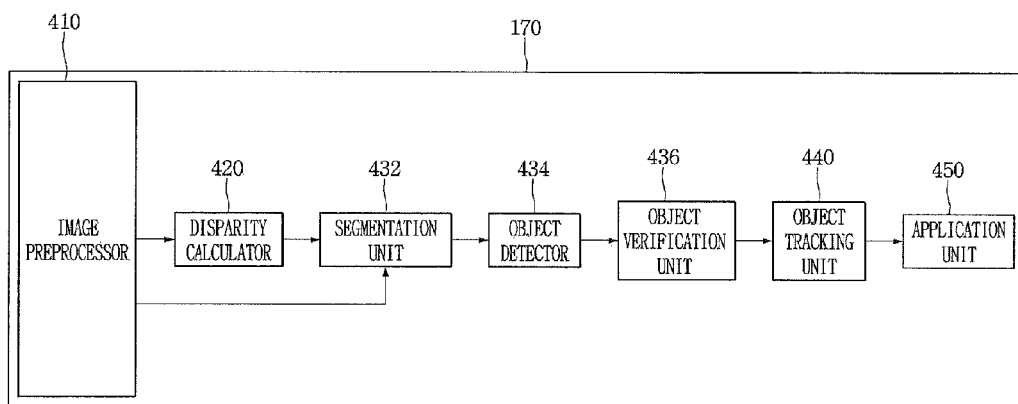
FIG. 5 is an internal block diagram illustrating an example of a processor of a driver assistance apparatus.

FIG. 5 is an internal block diagram of the processor 170 according to an implementation. FIG. 6 is a diagram that is referred to describe the operation of the processor 170 of FIG. 5.

Firstly, FIG. 5 is an example of the internal block diagram of the processor 170. The processor 170 in the driver assistance apparatus 100 may include an image preprocessor 410, a disparity calculator 420, an object detector 434, an object tracking unit 440, and an application unit 450. Although in FIG. 5 and the following description, it is described that an image is processed in the order of the image preprocessor 410, the disparity calculator 420, the object detector 434, the object tracking unit 440, and the application unit 450, implementations are not limited thereto.

The image preprocessor 410 may receive an image from the camera 160 to perform preprocessing.

In particular, the image preprocessor 410 may perform, on the image, noise reduction, rectification, calibration, color enhancement, color space conversion (CSC), interpolation, camera 160 gain control, and so on. Thus, it may be possible to acquire an image clearer than a stereo image captured by the camera 160.

The disparity calculator 420 may receive an image signal-processed by the image preprocessor 410, perform stereo matching on the received image, and acquire a disparity map according to stereo matching. As such, it may be possible to acquire disparity information on a stereo image in front of the vehicle 700.

In this case, the stereo matching may be performed in units of pixels or predetermined blocks of the stereo images. The disparity map may refer to a map that represents binocular parallax information on the stereo images, i.e., left and right images by a numerical value.

The segmentation unit 432 may perform segmentation and clustering on at least one images based on disparity information from the disparity calculator 420.

For example, the segmentation unit 432 may separate the background from the foreground for at least one of stereo images based on the disparity information.

As a specific example, it is possible to calculate, a region of the disparity map in which the disparity information is less than or equal to a predetermined value, as the background and remove a corresponding part. Thus, the foreground may be relatively separated. As another example, it is possible to calculate, a region of the disparity map in which the disparity information is equal to or greater than a predetermined value, as the foreground and extract a corresponding part. Thus, the foreground may be separated.

As such, by separating the foreground from the background based on the disparity information extracted based on the stereo image, it is possible to reduce a signal processing speed, a signal processing amount, and so on when an object is detected later.

The object detector 434 may detect an object based on an image segment from the segmentation unit 432.

That is, the object detector 434 may detect an object for at least one of images, based on the disparity information.

In particular, the object detector 434 may detect an object for at least one of images, based on the disparity information. For example, it is possible to detect an object from the foreground separated by the image segment.

The object verification unit 436 may classify and verify the separated object.

To this end, the object verification unit 436 may use an identification method using a neural network, a support vector machine (SVM) method, an identification method by AdaBoost using Haar-like features, a histograms of oriented gradients (HOG) method, or the like.

The object verification unit 436 may compare objects stored in the memory 140 with detected objects to verify an object.

For example, the object verification unit 436 may verify objects, such as a vehicle 700, a lane, a road surface, a sign, a dangerous area, a tunnel, and the like, that are located around the vehicle 700.

The object tracking unit 440 may perform tracking on the verified object. For example, it is possible to verify objects in acquired stereo images, calculate the motion or motion vector of the verified objects, and track the movement of a corresponding object based on the calculated motion or motion vector, sequentially. Thus, it is possible to track the vehicle 700, lane, road surface, sign, dangerous area, tunnel and the like that are located around the vehicle 700.

Next, the application unit 450 may calculate the degree of risk to the vehicle 700 based on various objects, e.g., another vehicle 700, lanes, road surfaces, signs and so on that are located around the vehicle 700. Also, it is possible to calculate collision possibility with the front car, whether the vehicle 700 slips, and so on.

In addition, based on the calculated degree of risk, collision possibility or slipping possibility, the application unit 450 may output, as vehicle 700 operation assistance information, a message for notifying a user of such information. Alternatively, it is also possible to generate, a control signal for posture control or driving control of the vehicle 700, as vehicle 700 control information.

The image pre-processor 410, the disparity calculator 420, the segmentation unit 432, the object detector 434, the object verification unit 436, the object tracking unit 440 and the application unit 450 may be the internal components of the image processor (see FIG. 31) in the processor 170.

According to an implementation, the processor 170 may include only some of the image pre-processor 410, the disparity calculator 420, the segmentation unit 432, the object detector 434, the object verification unit 436, the object tracking unit 440 and the application unit 450. If the camera 160 includes a mono camera 160 or around view camera 160, the disparity calculator 420 may be excluded. According to an implementation, the segmentation unit 432 may also be excluded.

Figure 6:
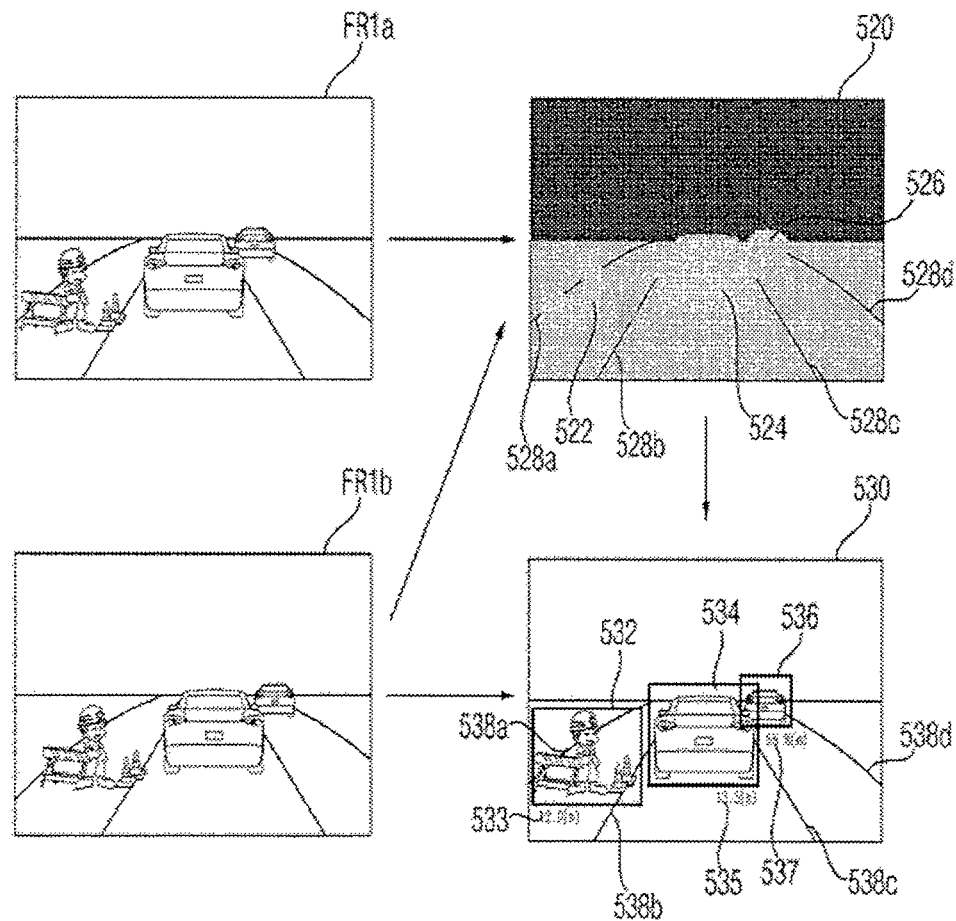
FIG. 6 is a diagram illustrating an example of an operation of a processor of a driver assistance apparatus.

Referring to FIG. 6, the camera 160 may acquire a stereo image for a first frame section.

The disparity calculator 420 in the processor 170 may receive stereo images FR1a and FR1b signal-processed by the image pre-processor 410, and perform stereo matching on the received stereo images FR1a and FR1b to acquire a disparity map 520.

The disparity map 520 puts parallax between the stereo images FR1a and FR1b into level, and it is possible to calculate that a distance to the vehicle 700 is less as a disparity level becomes greater, and the distance to the vehicle 700 is greater as the disparity level becomes less.

Such a disparity map may be displayed to have high luminance the higher the disparity level is and to have low luminance the lower the disparity level is.

FIG. 6 illustrates that in the disparity map 520, first to fourth lanes 528a to 528d respectively have corresponding disparity levels, and a construction area 522, a first front vehicle 700 or 524, and a second front vehicle 700 or 526 respectively have corresponding disparity levels.

The segmentation unit 432, the object detector 434, and the object verification unit 436 performs segment, object detection, and object verification on at least one of the stereo images FR1a and FR1b based on the disparity map 520.

FIG. 6 illustrates how to detect and verify an object on the second stereo image FR1b by using the disparity map 520.

That is, in an image 530, object detection and verification may be performed on first to fourth lanes 538a to 538d, a construction area 532, a first front vehicle 700 or 534, and a second front vehicle 700 or 536.

Figure 7:
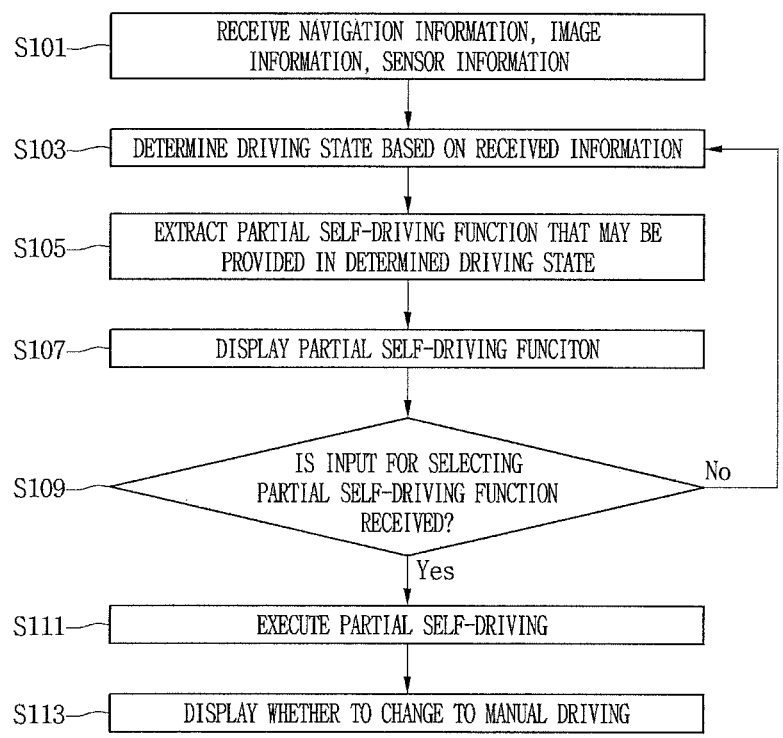
FIG. 7 is a flowchart illustrating an example of a process of providing and executing a self-driving function by a driver assistance apparatus according to a first implementation.
Figure 8:
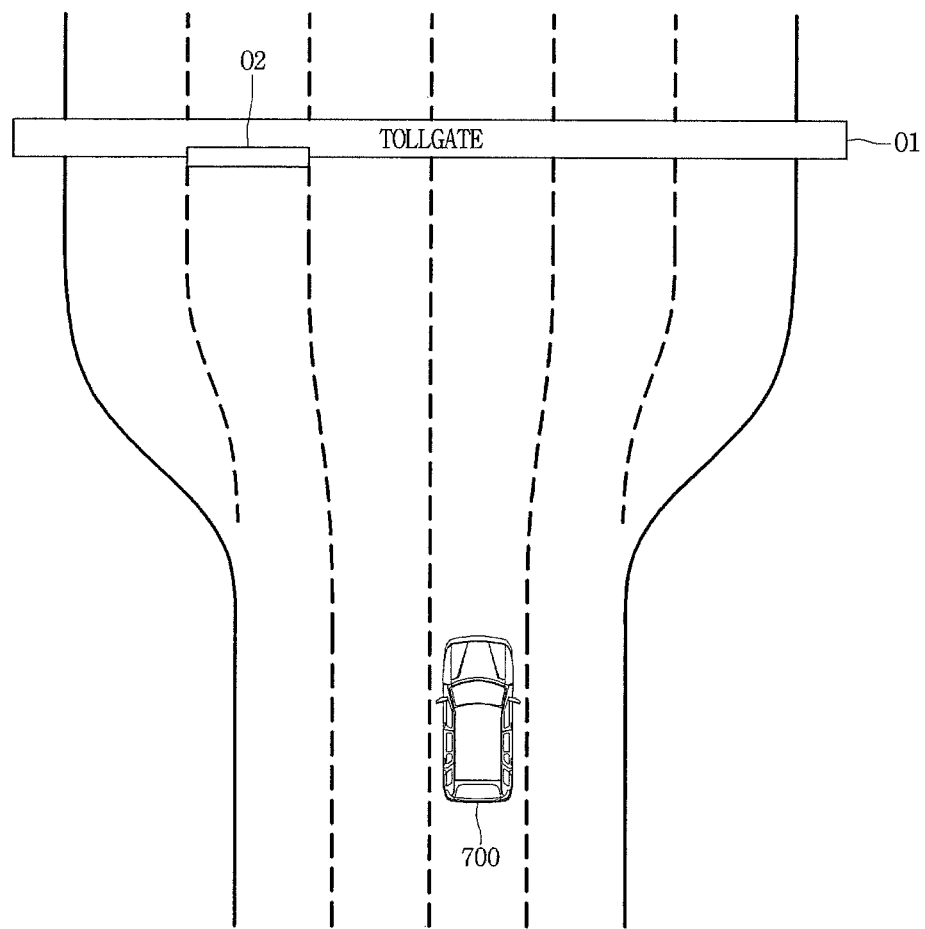
FIG. 8 is a diagram illustrating an example of a driving state of a vehicle approaching a tollgate.
Figure 9:
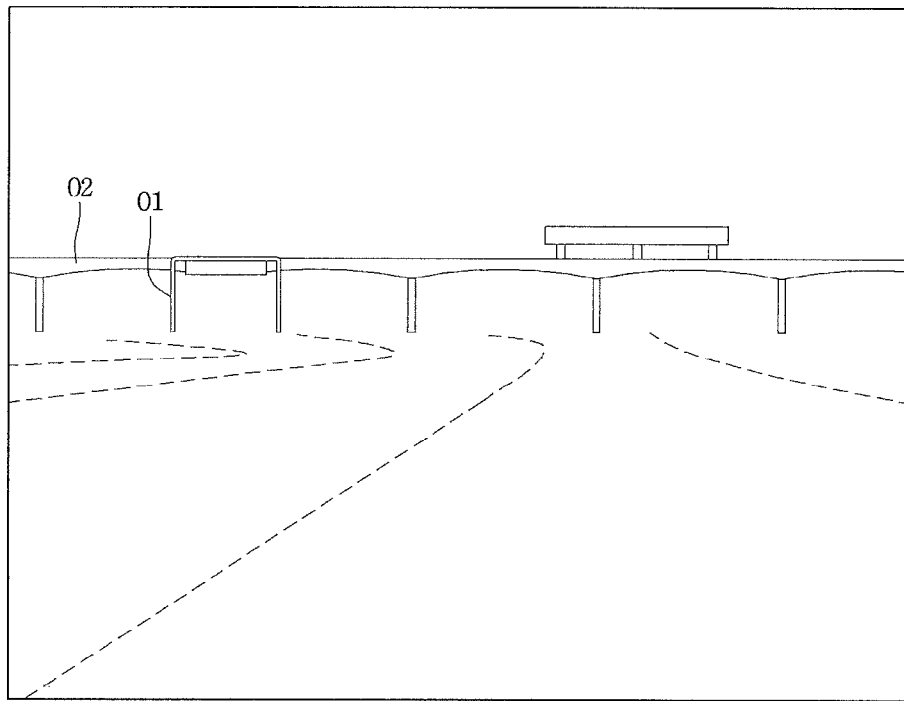
FIG. 9 is a diagram illustrating an example of an image captured by a camera in a driving state of a vehicle approaching a tollgate.
Figure 10:
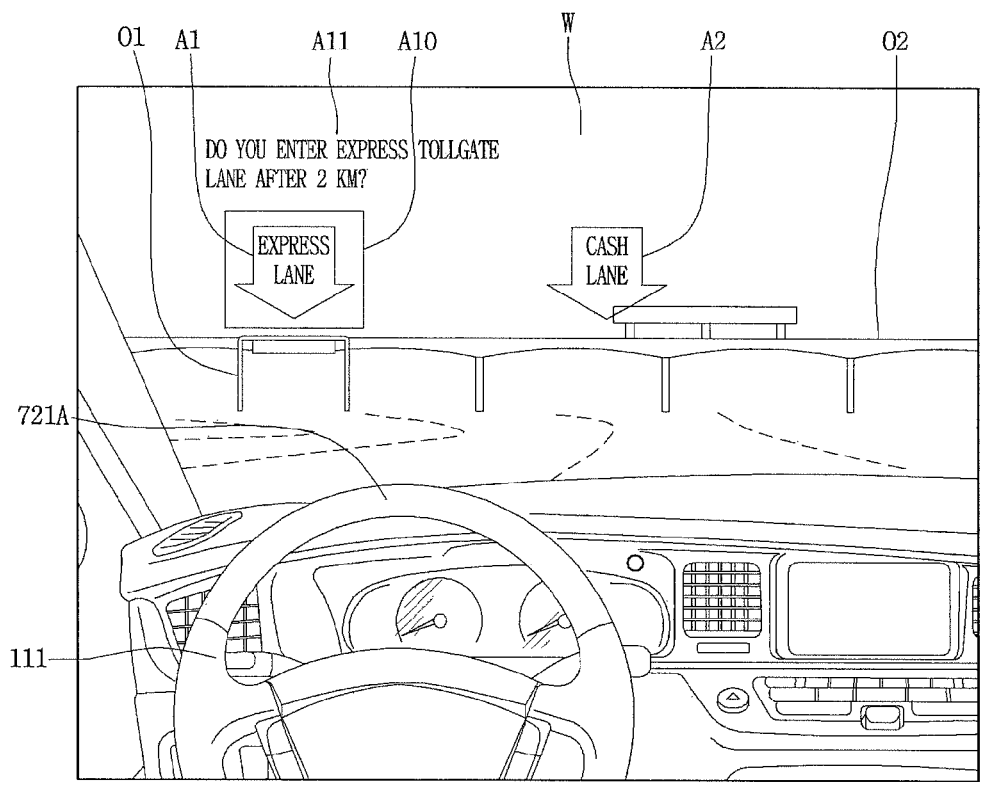
FIG. 10 is a diagram illustrating an example of a self-driving function in a driving state of a vehicle approaching a tollgate.
Figure 11:
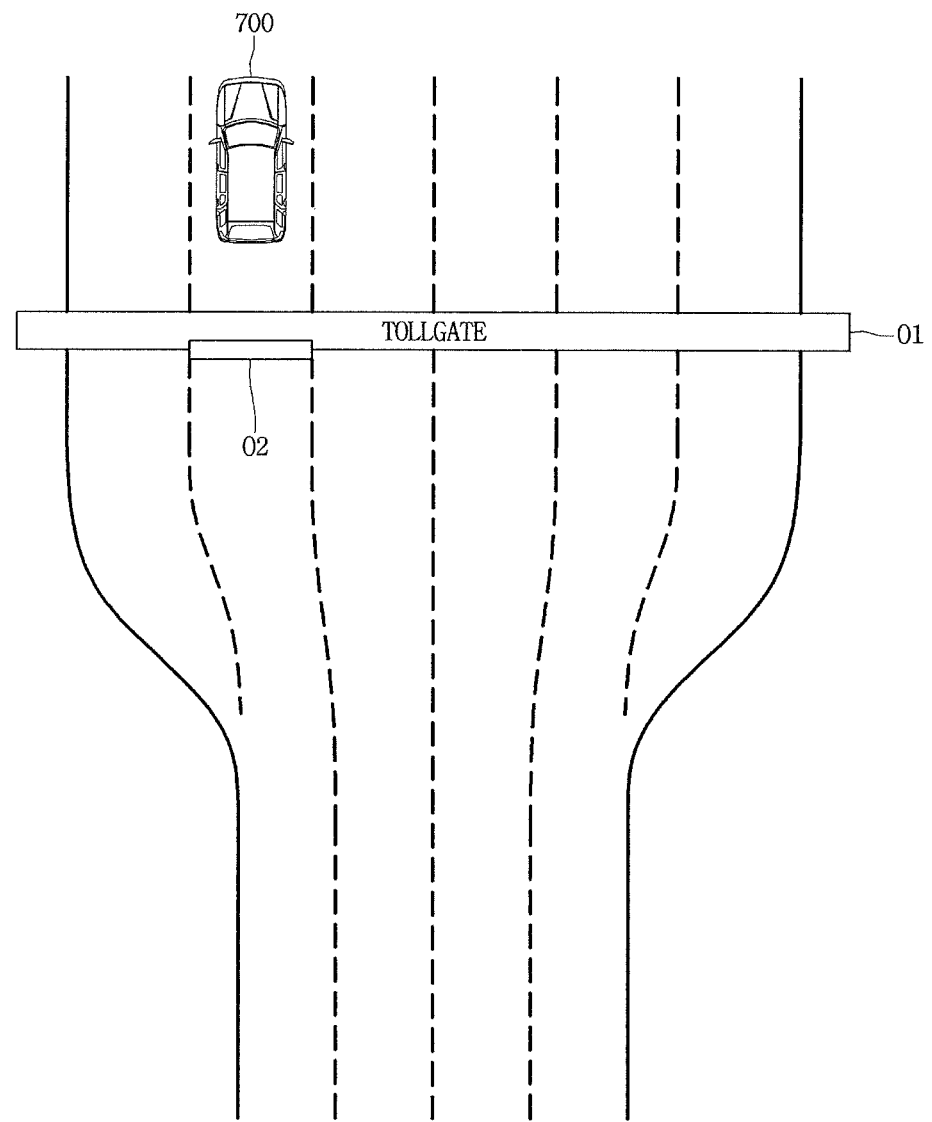
FIG. 11 is a diagram illustrating an example of a driving state after a self-driving function has been executed.
Figure 12:
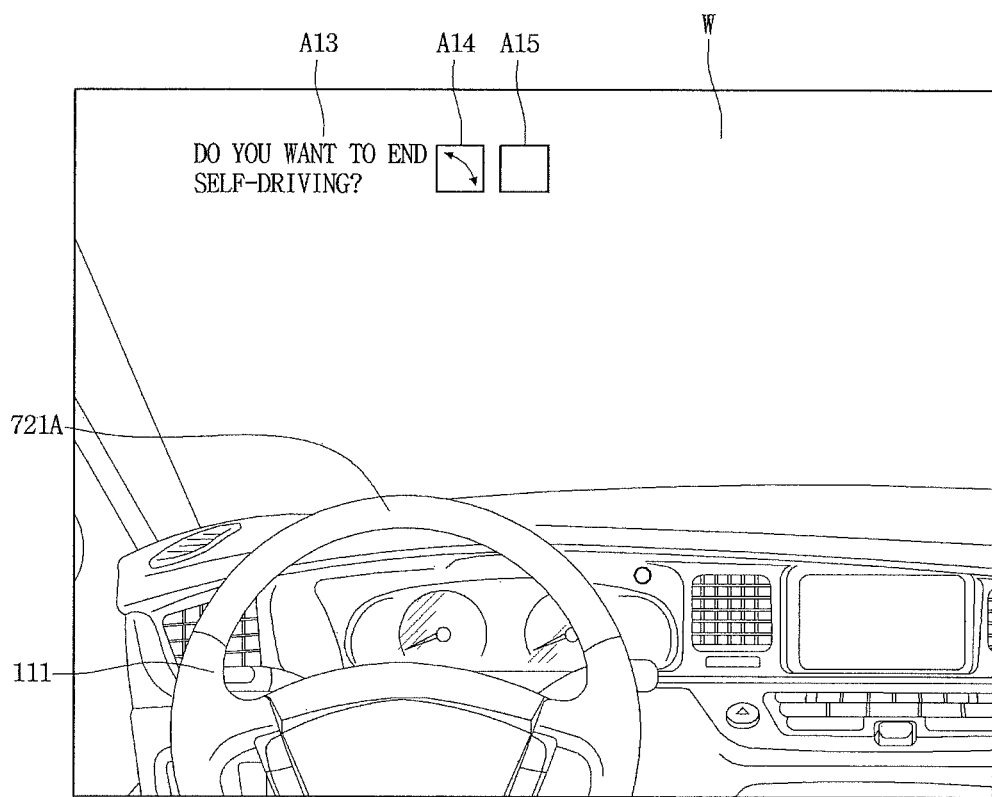
FIG. 12 is a diagram illustrating an example of a selection of a driving mode in a driving state after a self-driving function has been executed.

FIG. 7 is a flowchart of a process of providing and executing a self-driving function by the driver assistance apparatus 100 according to a first implementation. FIG. 8 represents the driving state of the vehicle 700 approaching a tollgate. FIG. 9 represents an image captured by the camera 160 in the driving state of FIG. 8. FIG. 10 represents how to propose a self-driving function in the driving state of FIG. 8. FIG. 11 represents after the self-driving function of FIG. 10 has been executed. FIG. 12 represents how to propose the selection of a driving mode in the driving state of FIG. 11.

In the following description, the process of proposing and executing, by the driver assistance apparatus 100, the self-driving function is described with reference to FIG. 7, and FIGS. 8 to 12 are referred for the convenience of description.

Firstly, the processor 170 may receive at least one of navigation information, image information, or sensor information in step S101.

The processor 170 may receive the navigation information through the interface unit 130 and/or the communication unit 120.

Also, the processor 170 may receive sensor information through the interface unit 130.

Also, the image information may be information that is generated by processing, by the processor 170, an image captured by the camera 160.

After receiving information, the processor 170 may detect the driving state of the vehicle 700 from at least one of the navigation information, image information, sensor information, and driving history information in step S103.

Referring to e.g., FIG. 8, the processor 170 may detect through route information in the navigation information and vehicle 700 position information that the vehicle 700 has approached the tollgate O1.

Referring to FIG. 9, the processor 170 may detect the tollgate O1 and the express tollgate sign O2 from the image captured by the camera 160 to detect that the vehicle 700 has approached the tollgate O1.

Then, the processor 170 may extract a self-driving function that may be provided in such a driving state in step 105.

That is, the processor 170 may recognize a self-driving function required for a user according to acquired information even without a separate user request.

For example, the processor 170 may extract a self-driving function of passing an express tollgate lane by self-driving, and a self-driving function of passing a cash lane by self-driving, when the vehicle 700 has approached the tollgate. That is, when the vehicle has approached the tollgate, the processor 170 may extract the self-driving function relating to passing the tollgate that a general driver has a difficulty, and execute the self-driving function according to a user selection to enable user convenience and safe driving.

Next, the processor 170 may enable a user to recognize the extracted self-driving function in step S107.

Specifically, the processor 170 may propose the extracted self-driving function to the user through the display unit 180 unit 180 and/or the audio output unit 185.

Referring to e.g., FIG. 10, the processor 170 may control the first display unit 181 to display an arrow indicating an express tollgate sign O2 as a first projected image A1 on a windshield W. Accordingly, the user may intuitively recognize that the proposed self-driving function is a function of passing the express tollgate lane.

Also, the processor 170 may control the first display unit 181 to display an arrow indicating the tollgate entrance as a second projected image A2 on the windshield W. Accordingly, the user may intuitively recognize that the proposed self-driving function is a function of passing the tollgate entrance indicated by the arrow.

Also, the processor 170 may control the first display unit 181 to display the self-driving function selected by the user, with a marker A10. Such a marker A10 may also be displayed to correspond to the projected images A1 and A2.

Also, when the user selects the self-driving function, the processor 170 may notify the user of the details of the self-driving function and provide a method of inputting whether to execute the function. For example, the processor 170 may display the detail of the self-driving function on the marker A10 with text A11. Also, the processor 170 may output the detail of the self-driving function through sound from the audio output unit 185.

In addition, the processor 170 may enable an input method for executing the displayed self-driving function to be further displayed.

Next, the processor 170 may receive an input of selecting whether to execute the self-driving function in step S109.

The processor 170 may receive a user input relating to whether to execute the self-driving function, through the input unit 110.

For example, a self-driving function execution input unit may be the gesture input unit 111 that is disposed at the steering input unit 721A. In addition, the processor 170 may sense a gesture sensed from the gesture input unit 111 and perform an operation corresponding to the sensed gesture.

For example, when a gesture of fixing a left hand and then swiping a right hand clockwise is sensed through the gesture input unit 111, the processor 170 may perform an operation of executing a self-driving function that matches a corresponding gesture. That is, the processor 170 may request the control unit of the vehicle 700 to execute the self-driving function of passing an express tollgate lane.

Also, the processor 170 may stop proposing the self-driving function when a gesture of fixing the right hand and then swiping the left hand clockwise is sensed.

Also, when a twisting input is received, the processor 170 may move the marker A10 to enable the user to select one of many self-driving functions.

When the proposed self-driving execution input is received, the processor 170 may enable the vehicle 700 to perform self-driving in step S111.

Specifically, the processor 170 may request the control unit of the vehicle 700 to execute the self-driving function.

Alternatively, the processor 170 may directly control the units of the vehicle 700 to execute the self-driving function.

Alternatively, the processor 170 may output the signal of the driving manipulation unit 721 of the vehicle 700 to execute the self-driving function. As examples, the processor 170 may directly control the steering input unit 721A, a brake pedal, an accelerator pedal, etc., to perform self-driving.

For example, in order to execute the self-driving function of passing the express tollgate lane, the processor 170 may enable the vehicle 700 to perform self-driving by a request and/or direct control until the vehicle passes the express tollgate lane as shown in FIG. 11.

Next, after the self-driving function is executed, the processor 170 may display whether to change the driving state, maintaining the self-driving, in step S113.

Referring to e.g., FIG. 12, the processor 170 may display, through the first display unit 181, a third projected image A13 that enables the selection of whether to execute self-driving, and a fourth projected image A14 that represents an input method thereof. In this case, the processor 170 may represent a fifth projected image A15 that represents the current driving state of the vehicle 700 for the safety of driving. In this example, the current driving state may represent the steering, acceleration, speed of the vehicle 700, how close the vehicle 700 is to another vehicle 700, and so on.

As such, the processor 170 may provide a self-driving function release user interface safely and easily.

As such, since a method of providing the self-driving function as described above enables a driver to easily execute the function, maintain driving attention and enables the vehicle to perform the self-driving only in a special driving situation in which the driver has a difficulty in driving, there are advantages in that safe driving is possible and it is possible to increase the convenience of the driver.

In the following, various examples of proposing a self-driving function is described with reference to FIGS. 13 to 27.

Figure 13:
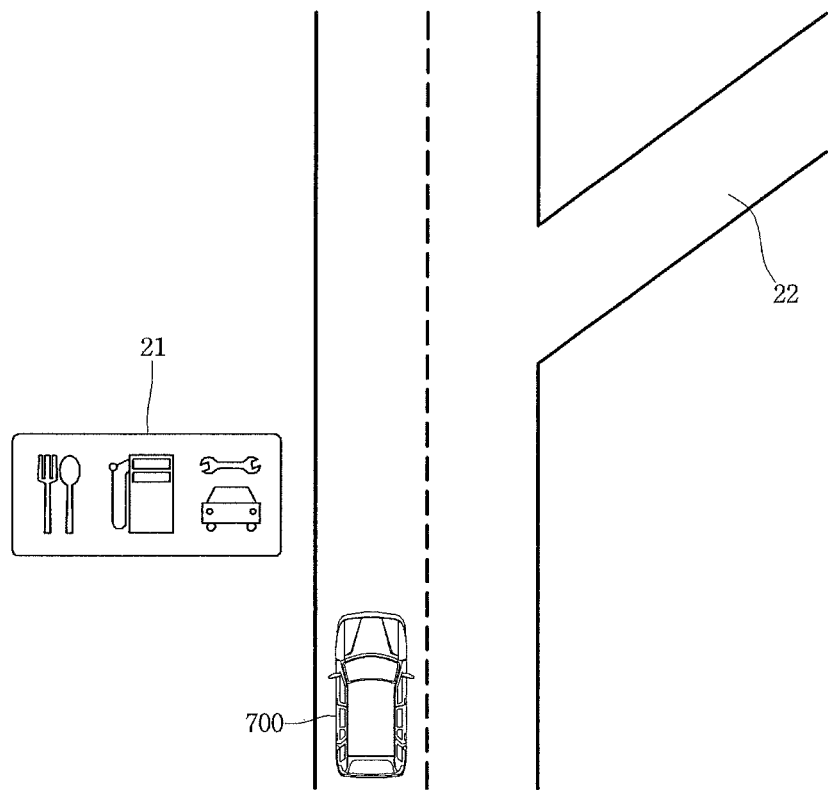
FIG. 13 is a diagram illustrating an example of a driving state of a vehicle approaching a service area.
Figure 14:
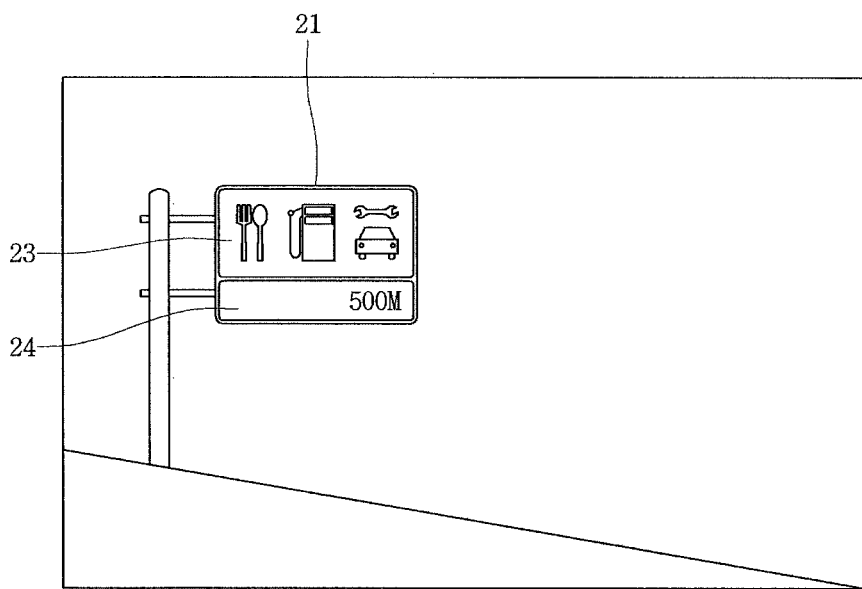
FIG. 14 is a diagram illustrating an example of an image captured by a camera in a driving state of a vehicle approaching a service area.
Figure 15:
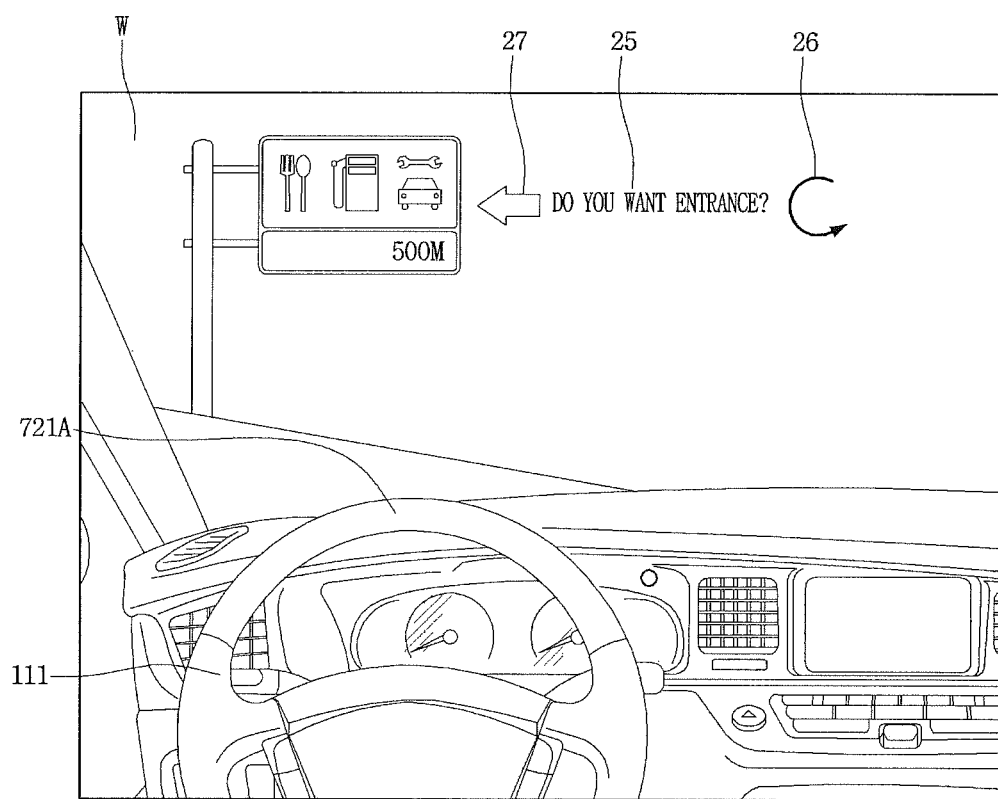
FIG. 15 is a diagram illustrating an example of a self-driving function in a driving state of a vehicle approaching a service area.

FIG. 13 represents the driving state of the vehicle 700 approaching a service area. FIG. 14 represents an image captured by the camera 160 in the driving state of FIG. 13. FIG. 15 represents how to propose a self-driving function in the driving state of FIG. 13.

The processor 170 may receive at least one of navigation information, image information and sensor information and detect the driving state of the vehicle 700 from the received information.

Specifically, referring to FIG. 13, the processor 170 may detect through route information in the navigation information and vehicle 700 position information that the vehicle 700 has approached the service area.

Referring to FIG. 14, the processor 170 may detect that the vehicle 700 has approached the service area, for example, based on image information that is generated by detecting a service area sign 21 as an object from an image captured by the camera 160. Furthermore, by analyzing an image in the service area sign 21, it is possible to further acquire image information such as facilities 23 in the service area and a distance 24 to the service area.

In addition, the processor 170 may extract a self-driving function that may be provided according to the detected driving state. For example, when approaching the service area, the processor 170 may extract the self-driving function in which self-driving into the service area is performed.

In addition, the processor 170 may display the extracted self-driving function through the display unit 180 so that the user may recognize the function.

Referring to FIG. 15, it is possible to control the first display unit 181 to display an arrow 27 indicating the service area sign 21 on the windshield W. Accordingly, the user may intuitively recognize that the self-driving function proposed by the driver assistance apparatus 100 is entering the service area.

Also, when the user selects the self-driving function, the processor 170 may notify the user of the details of the self-driving function and provide a method of inputting whether to execute the function.

For example, the processor 170 may display the detail of the self-driving function with text 25 on the arrow 27. Also, the processor 170 may output the detail of the self-driving function through sound from the audio output unit 185. In addition, the processor 170 may enable an input operation 26 of executing the displayed self-driving function to be further displayed.

In addition, when the user performs the displayed self-driving function execution input operation, the processor 170 may receive it from the input unit 110 to perform a corresponding self-driving function.

For example, when the user performs a twisting input, the processor 170 may execute a self-driving function to enable the vehicle 700 to perform self-driving in a service area entrance section 22.

In summary, the user may receive a proposal to perform a self-driving function through a pop up window during driving and enable the vehicle 700 to perform self-driving by a single input of a twisting gesture until the vehicle arrives at the service area.

Figure 16:
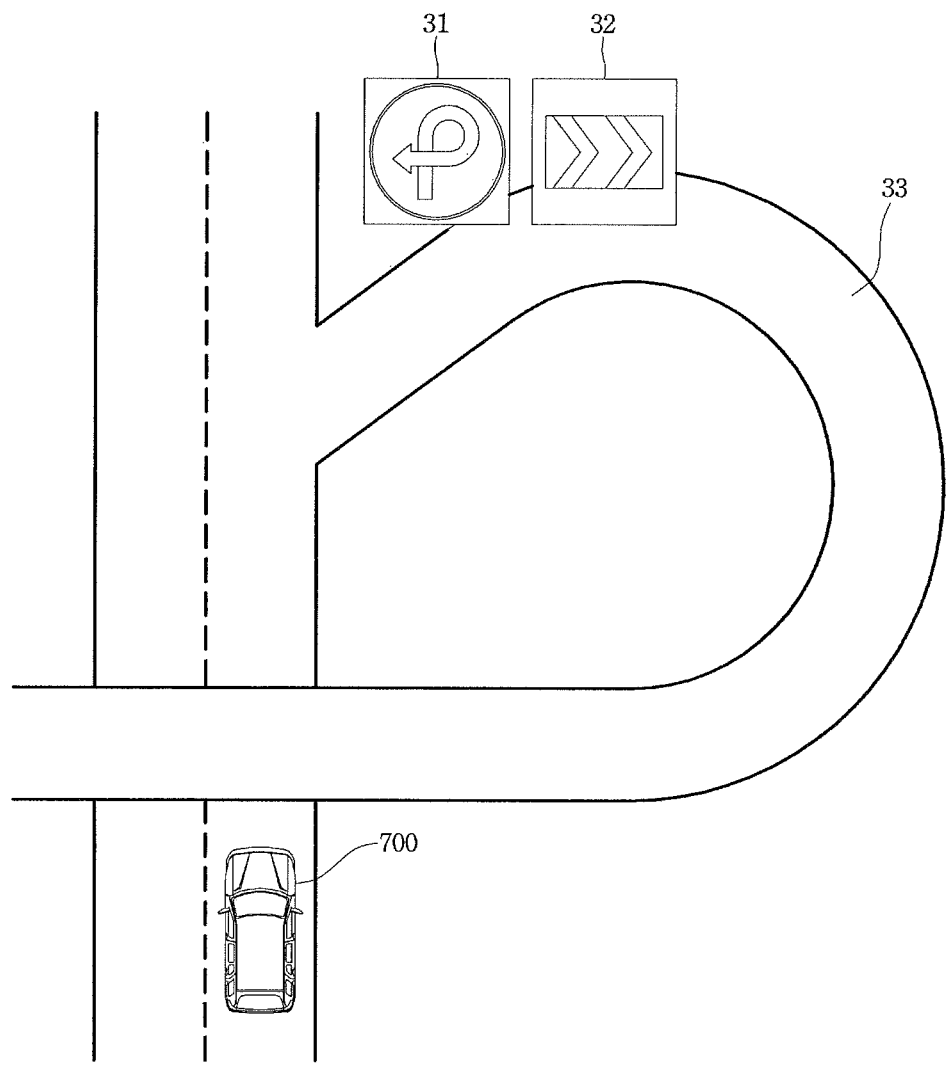
FIG. 16 is a diagram illustrating an example of a driving state of a vehicle approaching a ramp.
Figure 17:
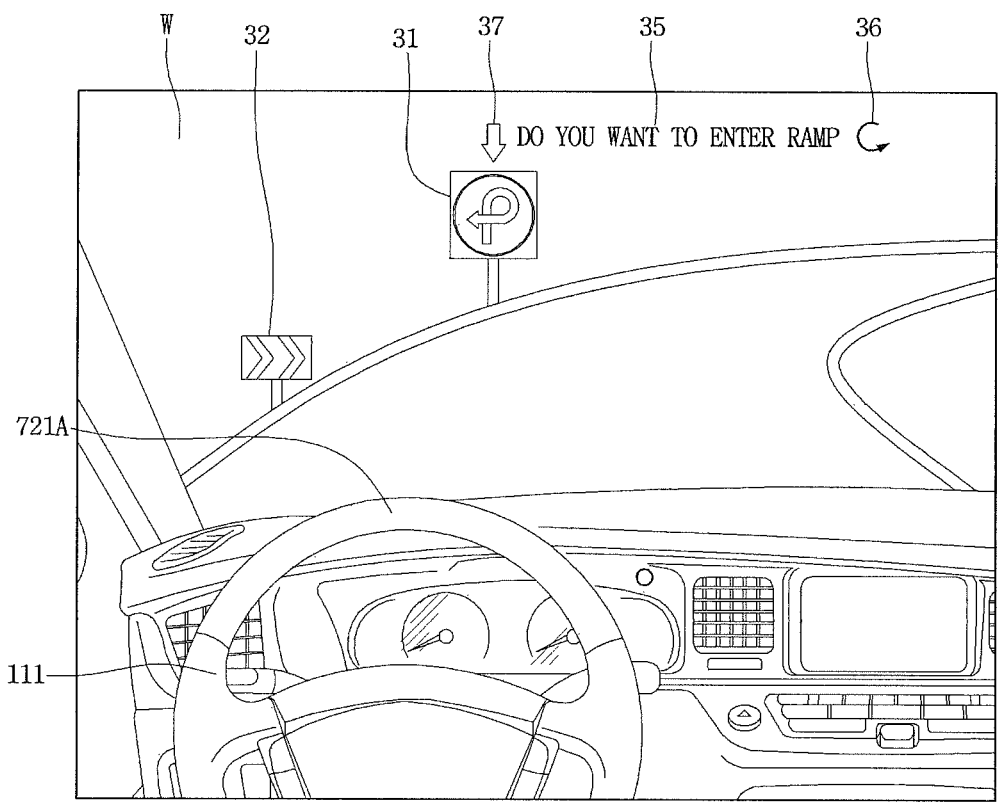
FIG. 17 is a diagram illustrating an example of a self-driving function in a driving state of a vehicle approaching a ramp.

FIG. 16 represents the driving state of the vehicle 700 approaching a ramp. Examples of such a scenario include approaching an on-ramp for entering a highway, or an off-ramp for exiting a highway. FIG. 17 represents how to propose a self-driving function in the driving state of FIG. 16.

The processor 170 may receive at least one of navigation information, image information and sensor information and detect the driving state of the vehicle 700 from the received information.

Specifically, referring to FIG. 14, the processor 170 may detect through route information in the navigation information and vehicle 700 position information that the vehicle 700 has approached the ramp 33.

Also, the processor 170 may detect that the vehicle 700 has approached the ramp 33, from image information that is generated by detecting ramp signs 31 and 32 as objects from an image captured by the camera 160.

In addition, the processor 170 may extract a self-driving function that may be provided according to the detected driving state. That is, the processor 170 may extract a self-driving function of passing through the ramp 33 that a user generally has a difficulty.

In addition, the processor 170 may display the extracted self-driving function through the display unit 180 so that the user may recognize the function.

Referring to FIG. 17, it is possible to control the first display unit 181 to display an arrow 37 indicating the ramp signs 31 and 32 on the windshield W. Accordingly, the user may intuitively recognize that the self-driving function proposed by the driver assistance apparatus 100 is passing through the ramp 33.

Also, when the user selects the self-driving function, the processor 170 may notify the user of the details of the self-driving function and provide a method of inputting whether to execute the function.

For example, the processor 170 may display the detail of the self-driving function with text 35 on the arrow 37. Also, the processor 170 may output the detail of the self-driving function through sound from the audio output unit 185. In addition, the processor 170 may enable an input method 36 of executing the displayed self-driving function to be further displayed.

In addition, when the user performs the displayed self-driving function execution input method, the processor 170 may receive it from the input unit 110 to perform a corresponding self-driving function.

For example, when the user performs a twisting input, the processor 170 may execute a self-driving function to relay, to the vehicle 700, an execution input of enabling the vehicle 700 to perform self-driving until the vehicle passes through the ramp 33.

In summary, the user may receive, through the driver assistance apparatus 100, a proposal to perform the self-driving function of passing the ramp 33 through a pop up window during driving and enable the vehicle 700 to perform self-driving by a single input of a twisting gesture until the vehicle passes the ramp 33.

Figure 18:
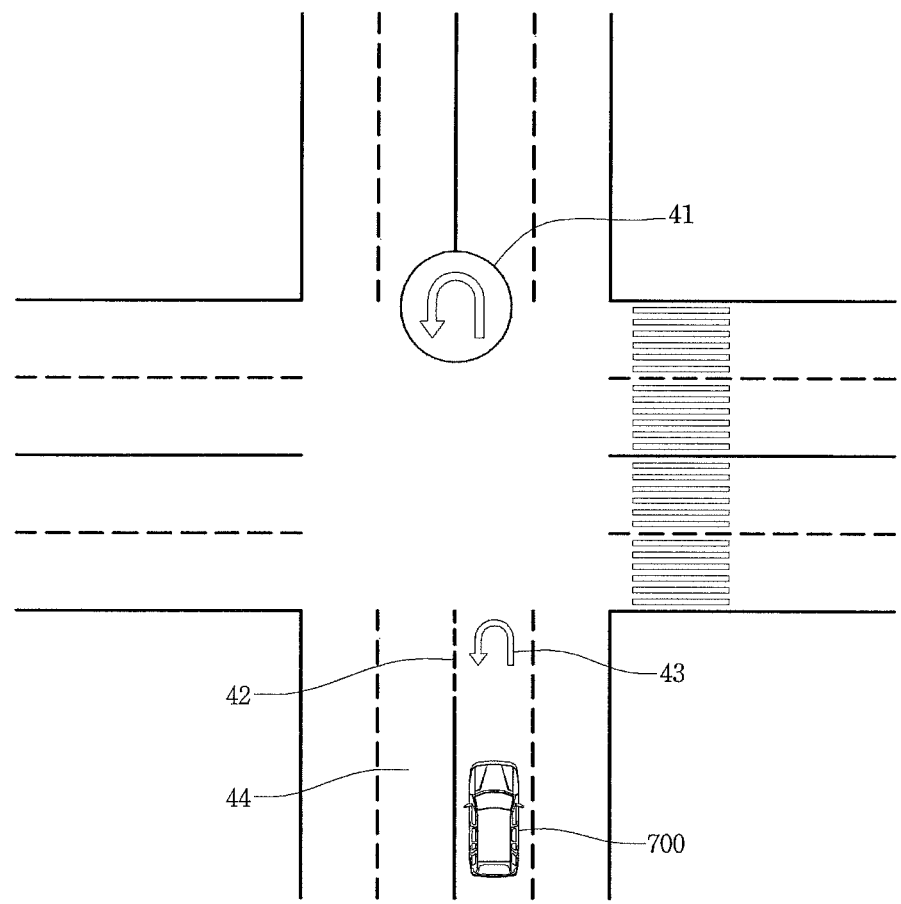
FIG. 18 is a diagram illustrating an example of a driving state of a vehicle before a U-turn.
Figure 19:
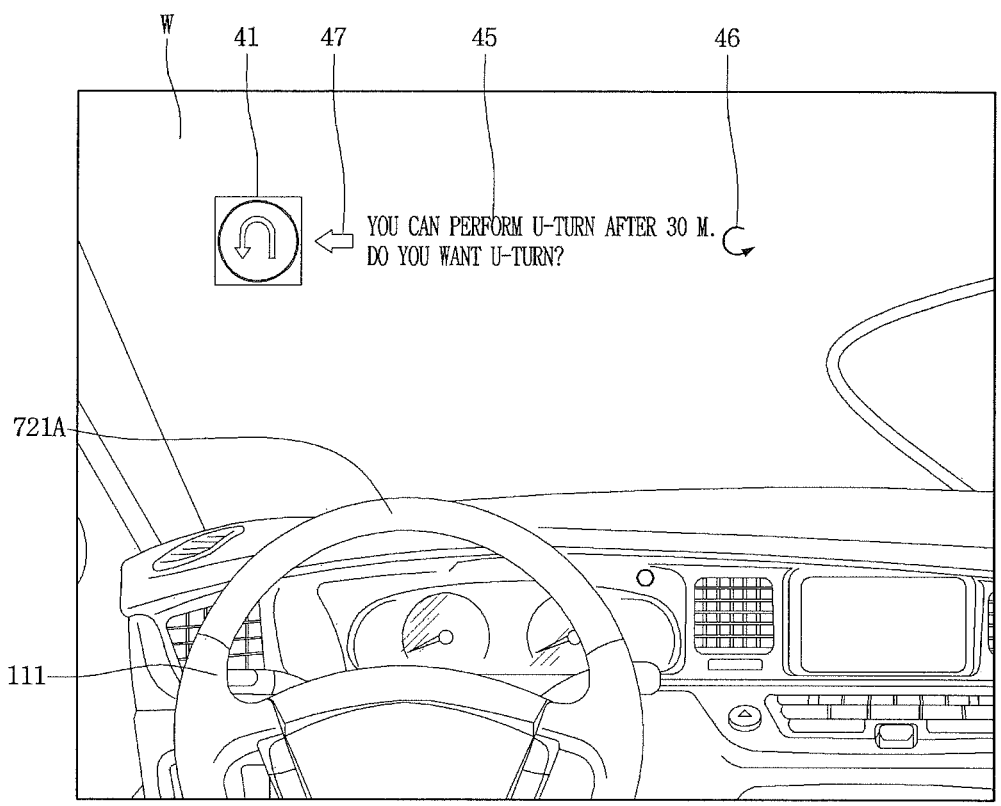
FIG. 19 is a diagram illustrating an example of a self-driving function in a driving state of a vehicle before a U-turn.

FIG. 18 represents the driving state of the vehicle 700 before a U-turn. FIG. 19 represents how to propose a self-driving function in the driving state of FIG. 18.

The processor 170 may receive at least one of navigation information, image information and sensor information and detect the driving state of the vehicle 700 from the received information.

Specifically, referring to FIG. 18, the processor 170 may detect through route information in the navigation information and vehicle 700 position information that the vehicle 700 is about to make a U-turn.

Also, the processor 170 may detect that the vehicle 700 is about to make a U-turn based on image information that is generated, for example by detecting U-turn signs 41 and 43 as objects from an image captured by the camera 160. In this case, the processor 170 may detect a lane as an object from the image to detect a U-turn permitted lane 42.

The processor 170 may extract a self-driving function that may be provided according to the detected driving state. For example, the processor 170 may extract a self-driving function of performing U-turn that a user generally has a difficulty.

The processor 170 may display the extracted self-driving function through the display unit 180 so that the user may recognize the function.

Referring to FIG. 19, it is possible to control the first display unit 181 to display an arrow 47 indicating the U-turn signs 41 and 43 on the windshield W. Accordingly, the user may intuitively recognize that the self-driving function proposed by the driver assistance apparatus 100 is performing U-turn.

Also, when the user selects the self-driving function, the processor 170 may notify the user of the details of the self-driving function and provide a method of inputting whether to execute the function.

For example, the processor 170 may display the detail of the self-driving function with text 45 on the arrow 47. Also, the processor 170 may output the detail of the self-driving function through sound from the audio output unit 185. In addition, the processor 170 may enable an input method 46 of executing the displayed self-driving function to be further displayed.

In addition, when the user performs the displayed self-driving function execution input method, the processor 170 may receive it from the input unit 110 to perform a corresponding self-driving function.

For example, when the user performs a twisting input, the processor 170 may execute a self-driving function to relay, to the vehicle 700, an execution input of enabling the vehicle 700 to perform self-driving until the vehicle arrives at a corresponding lane.

In summary, the user may receive, through the driver assistance apparatus 100, a proposal to perform the self-driving function of performing U-turn through a pop-up window during driving, and enable the vehicle 700 to perform self-driving by a single input of a twisting gesture until the vehicle arrives at a corresponding lane.

Figure 20:
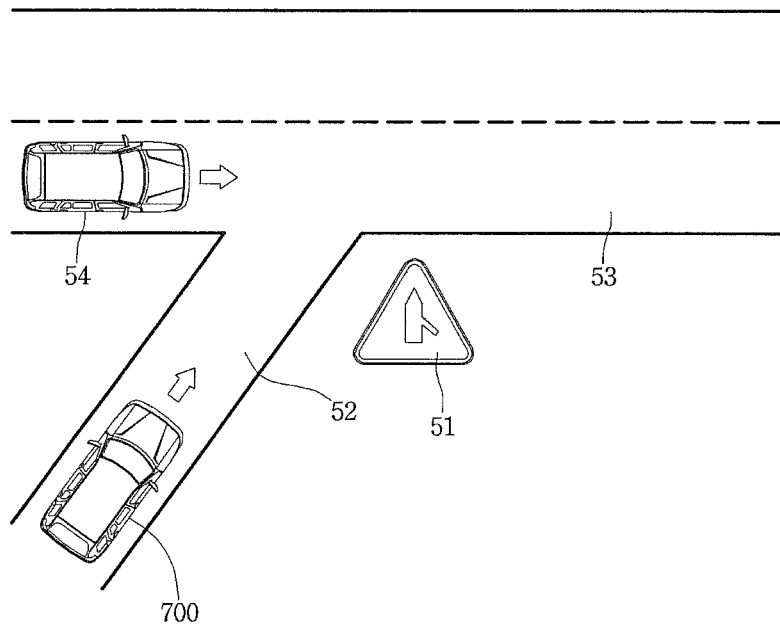
FIG. 20 is a diagram illustrating an example of a driving state of a vehicle before entering an expressway.
Figure 21:
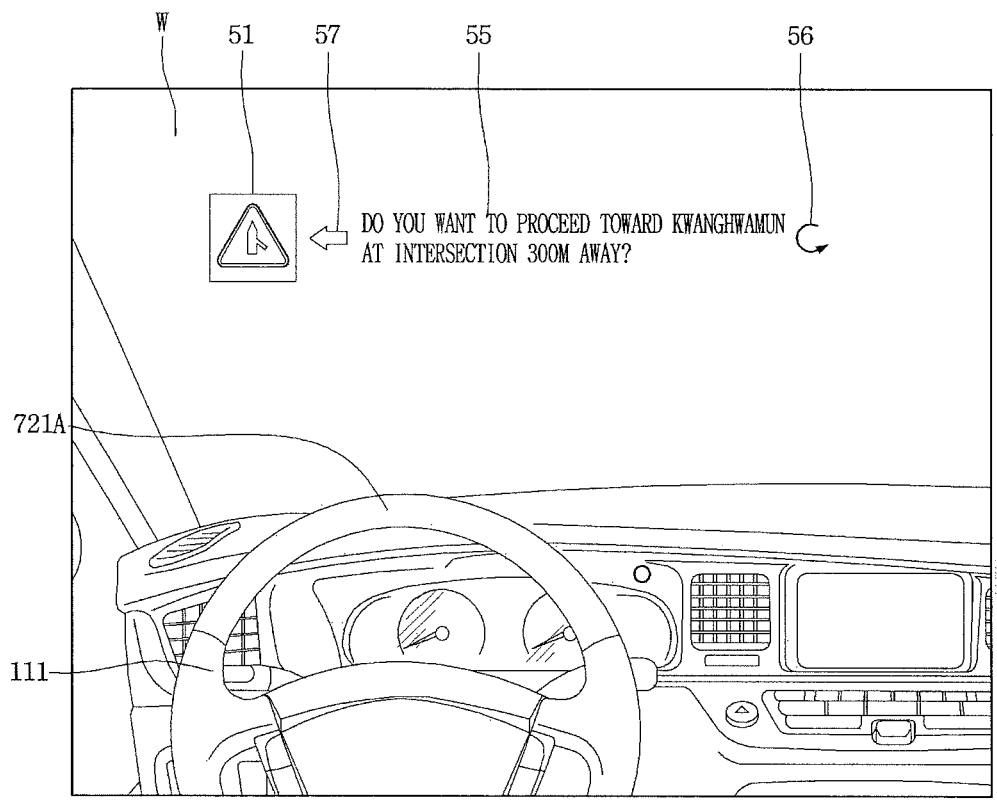
FIG. 21 is a diagram illustrating an example of a self-driving function in a driving state of a vehicle before entering an expressway.

FIG. 20 represents the driving state of the vehicle 700 before entering a road. FIG. 21 represents how to propose a self-driving function in the driving state of FIG. 20.

The processor 170 may receive at least one of navigation information, image information and sensor information and detect the driving state of the vehicle 700 from the received information.

Specifically, referring to FIG. 20, the processor 170 may detect through route information in the navigation information and vehicle 700 position information that the vehicle 700 is before entrance into a road 53.

Also, the processor 170 may detect that the vehicle 700 has not entered a road 53, from image information that is generated by detecting a road entrance sign 51 as an object from an image captured by the camera 160. In this case, the processor 170 may recognize, through the communication unit 120, the position of another vehicle 54 that obstructs entrance.

In addition, the processor 170 may extract a self-driving function that may be provided according to the detected driving state. That is, the processor 170 may extract a self-driving function of entering road 53 that a user generally has a difficulty.

In addition, the processor 170 may display the extracted self-driving function through the display unit 180 so that the user may recognize the function.

Referring to FIG. 21, it is possible to control the first display unit 181 to display an arrow 57 indicating the expressway entrance sign 51 on the windshield W. Accordingly, the user may intuitively recognize that the self-driving function proposed by the driver assistance apparatus 100 is entering the road 53.

Also, when the user selects the self-driving function, the processor 170 may notify the user of the details of the self-driving function and provide a method of inputting whether to execute the function.

For example, the processor 170 may display the detail of the self-driving function with text 55 on the arrow 57. Also, the processor 170 may output the detail of the self-driving function through sound from the audio output unit 185. In addition, the processor 170 may enable an input method 56 of executing the displayed self-driving function to be further displayed.

In addition, when the user performs the displayed self-driving function execution input method, the processor 170 may receive it from the input unit 110 to perform a corresponding self-driving function.

For example, when the user performs a twisting input, the processor 170 may execute a self-driving function to relay, to the vehicle 700, an execution input of enabling the vehicle 700 to perform self-driving so that the vehicle enters the expressway 53.

In summary, the user may receive, through the driver assistance apparatus 100, a proposal to perform the self-driving function of entering the expressway 53 through a pop up window during driving, and enable the vehicle 700 to perform self-driving by a single input of a twisting gesture until the vehicle arrives at the expressway 53.

Figure 22:
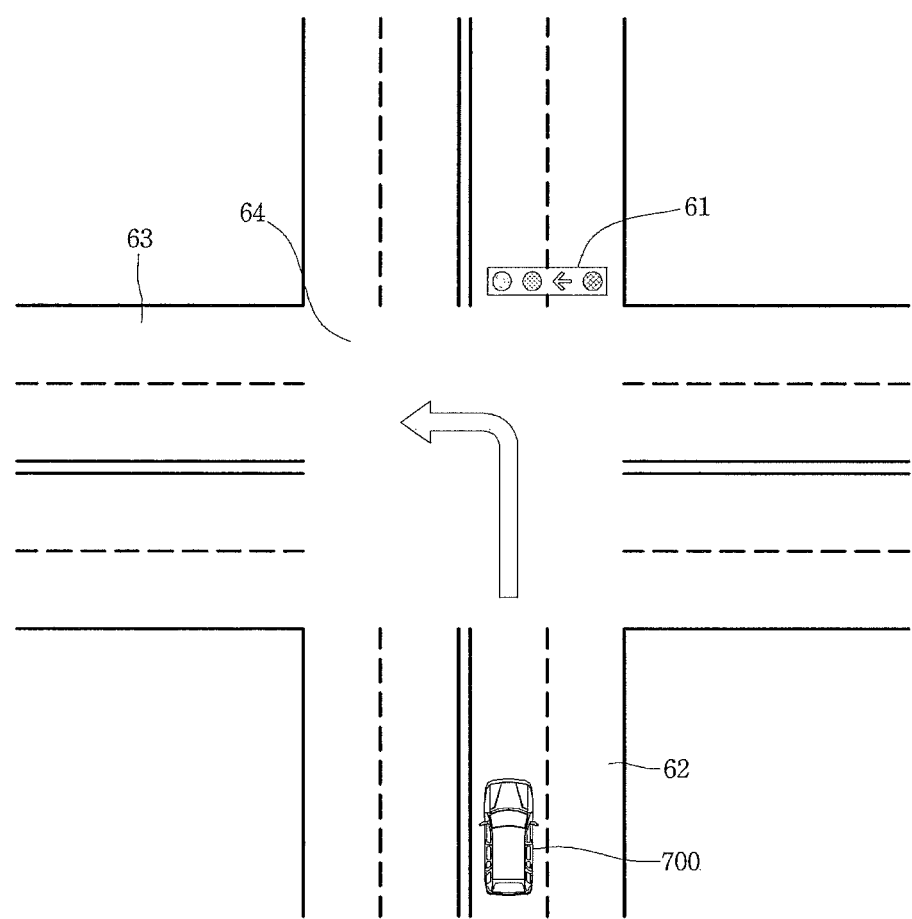
FIG. 22 is a diagram illustrating an example of a driving state of a vehicle before entering an intersection.
Figure 23:
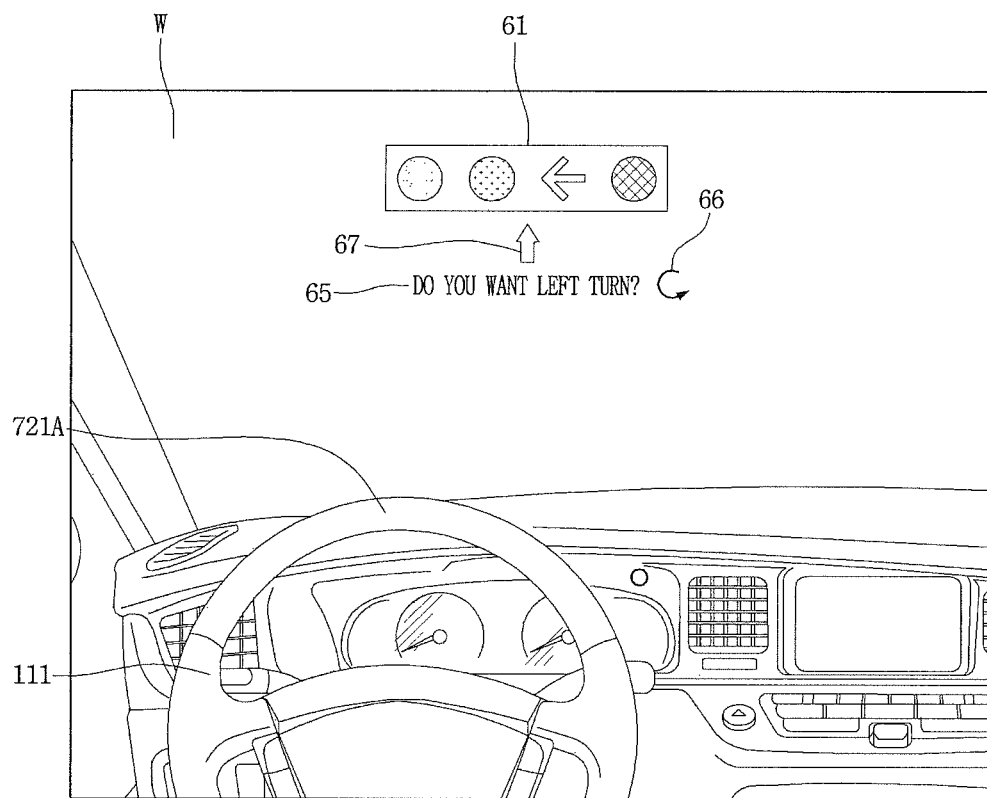
FIG. 23 is a diagram illustrating an example of a self-driving function in a driving state of a vehicle before entering an intersection.

FIG. 22 represents the driving state of the vehicle 700 before entering the intersection. FIG. 23 represents how to propose a self-driving function in the driving state of FIG. 22. The processor 170 may receive at least one of navigation information, image information and sensor information and detect the driving state of the vehicle 700 from the received information.

Specifically, referring to FIG. 20, the processor 170 may detect through route information in the navigation information and vehicle 700 position information that the vehicle 700 is at the intersection 64.

Also, the processor 170 may detect that the vehicle 700 is at the intersection 64, from image information that is generated by detecting a signal light 61 as an object from an image captured by the camera 160.

In addition, the processor 170 may extract a self-driving function that may be provided according to the detected driving state. In this case, when there is a need to turn to the left based on route information, it is possible to extract a self-driving function of performing self-driving to turn to the left.

In addition, the processor 170 may display the extracted self-driving function through the display unit 180 so that the user may recognize the function.

Referring to FIG. 23, it is possible to control the first display unit 181 to display an arrow 67 indicating the signal light 61 on the windshield W. Accordingly, the user may intuitively recognize that the self-driving function proposed by the driver assistance apparatus 100 is turning to the left.

Also, when the user selects the self-driving function, the processor 170 may notify the user of the details of the self-driving function and provide a method of inputting whether to execute the function.

For example, the processor 170 may display the detail of the self-driving function with text 65 on an arrow 67. Also, the processor 170 may output the detail of the self-driving function through sound from the audio output unit 185. In addition, the processor 170 may enable an input method 66 of executing the displayed self-driving function to be further displayed.

In addition, when the user performs the displayed self-driving function execution input method, the processor 170 may receive it from the input unit 110 to perform a corresponding self-driving function.

For example, when the user performs a twisting input, the processor 170 may execute a self-driving function to relay, to the vehicle 700, a self-driving execution input of enabling the vehicle 700 to turn to the left.

In summary, the user may receive, through the driver assistance apparatus 100, a proposal to perform a recommended self-driving function of turning to the left at an intersection through a pop-up window during driving, and enable the vehicle 700 to perform self-driving by a single input of a twisting gesture so that the vehicle turns to the left at the intersection.

Figure 24:
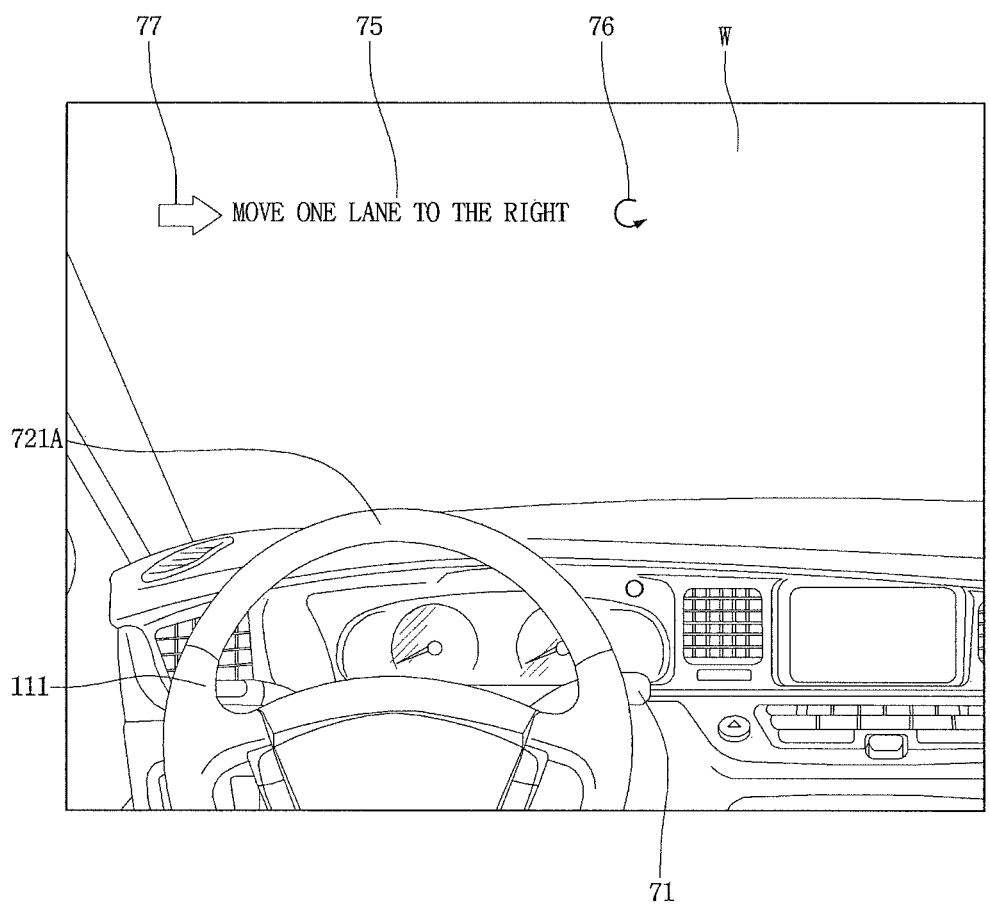
FIG. 24 is a diagram illustrating an example of a self-driving function in a driving state in which a right-turn signal has been input.

FIG. 24 represents how to propose a self-driving function in the driving state in which a right-turn signal has been input.

The processor 170 may receive at least one of navigation information, image information and sensor information and detect the driving state of the vehicle 700 from the received information.

For example, the processor 170 may detect through turn signal information in sensor information that there is a need to change a lane and/or turn to the left/right. That is, when a user inputs a right-turn signal through a manipulation unit 71, the processor 170 may receive it as sensor information and extract a self-driving function of moving to the right because there is need to turn to the right.

In addition, the processor 170 may display the extracted self-driving function through the display unit 180 so that the user may recognize the function.

Referring to FIG. 24, it is possible to control the first display unit 181 to display an arrow 77 that represents the change of a lane, and text 75 that represents the self-driving function.

Also, when the user selects the self-driving function, the processor 170 may notify the user of the details of the self-driving function and provide a method of inputting whether to execute the function.

Also, the processor 170 may output the detail of the self-driving function through sound from the audio output unit 185.

In addition, the processor 170 may enable an input method 76 of executing the displayed self-driving function to be further displayed.

In addition, when the user performs the displayed self-driving function execution input method, the processor 170 may receive it from the input unit 110 to perform a corresponding self-driving function.

For example, when the user performs a twisting input, the processor 170 may execute a self-driving function to relay, to the vehicle 700, a self-driving execution input of enabling the vehicle 700 to move to the right.

In summary, the user may receive, through the driver assistance apparatus 100, a proposal to perform the self-driving function of changing a lane through a pop up window during driving, and enable the vehicle 700 to perform self-driving by a single input of a twisting gesture so that the vehicle changes to the appropriate lane.

Figure 25:
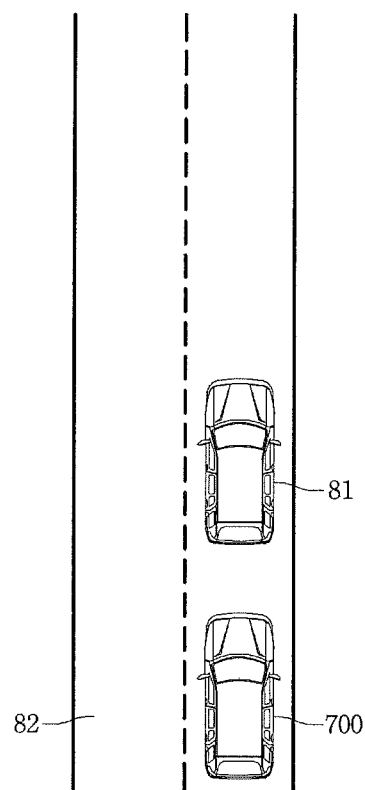
FIG. 25 is a diagram illustrating an example of a driving state of a vehicle driving behind a preceding vehicle.
Figure 26:
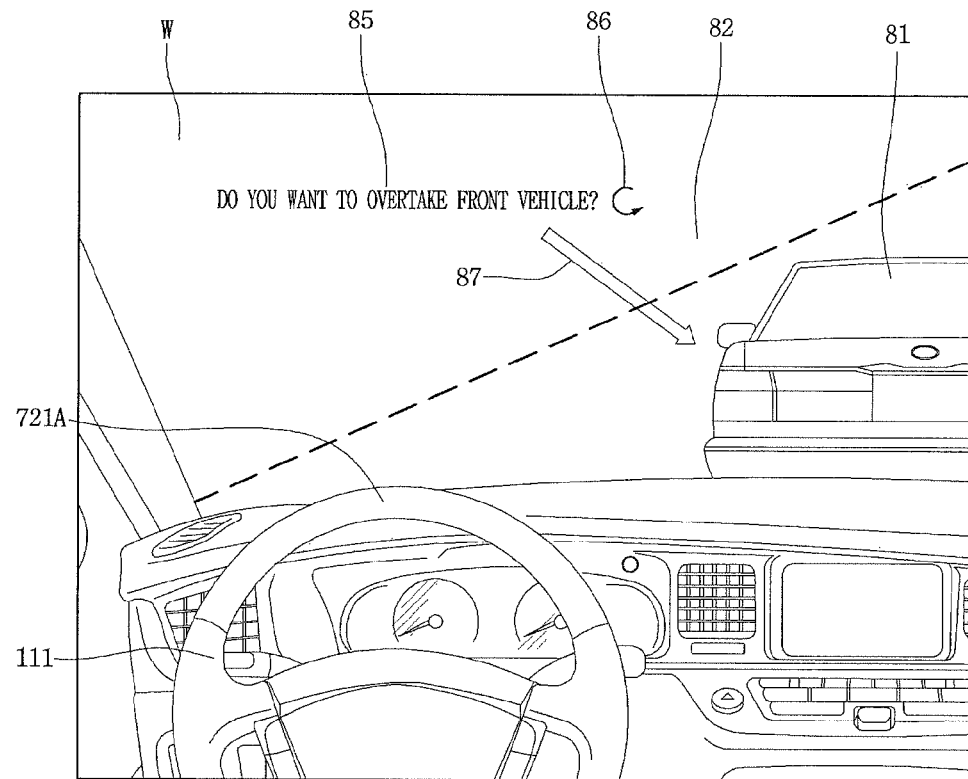
FIG. 26 is a diagram illustrating an example of a self-driving function in a driving state of a vehicle driving behind a preceding vehicle.

FIG. 25 represents a driving state in which a vehicle 700 drives behind another vehicle 81 that is in front of the vehicle 700. FIG. 26 represents how to propose a automatic driving function in the driving state of FIG. 25.

The processor 170 may receive at least one of navigation information, image information and sensor information and detect the driving state of the vehicle 700 from the received information.

Specifically, referring to FIG. 25, the processor 170 may detect through route information in the navigation information, vehicle 700 position information, information on how close to the preceding vehicle 81 the vehicle 700 is, and so on that a preceding vehicle 81 is in front of the vehicle 700.

Also, the processor 170 may detect that there is a vehicle 81 in front of the vehicle 700, from image information that is generated by detecting the preceding vehicle 81 as an object from an image captured by the camera 160.

In addition, the processor 170 may extract a self-driving function that may be provided according to the detected driving state. For example, the processor 170 may extract a self-driving function of overtaking the preceding vehicle 81, when the preceding vehicle 81 is located within a predetermined distance of the vehicle 700 for a preset duration of time.

In addition, the processor 170 may display the extracted self-driving function through the display unit 180 so that the user may recognize the function.

Referring to FIG. 26, it is possible to control the first display unit 181 to display an arrow 87 indicating the preceding vehicle 81 on the windshield W. Accordingly, the user may intuitively recognize that the self-driving function proposed by the driver assistance apparatus 100 is a function of overtaking the preceding vehicle 81.

Also, when the user selects the self-driving function, the processor 170 may notify the user of the details of the self-driving function and provide a method of inputting whether to execute the function.

For example, the processor 170 may display the detail of the self-driving function with text 85 on the arrow 87. Also, the processor 170 may output the detail of the self-driving function through sound from the audio output unit 185. In addition, the processor 170 may enable an input method 86 of executing the displayed self-driving function to be further displayed.

In addition, when the user performs the displayed self-driving function execution input method, the processor 170 may receive it from the input unit 110 to perform a corresponding self-driving function.

For example, when the user performs a twisting input, the processor 170 may execute a self-driving function to relay, to the vehicle 700, a self-driving execution input of enabling the vehicle 700 to overtake the preceding vehicle 81.

In summary, the user may receive, through the driver assistance apparatus 100, a proposal to perform the self-driving function of overtaking through a pop up window during driving, and enable the vehicle 700 to perform self-driving by a single input of a twisting gesture so that the vehicle performs an overtaking function.

Figure 27:
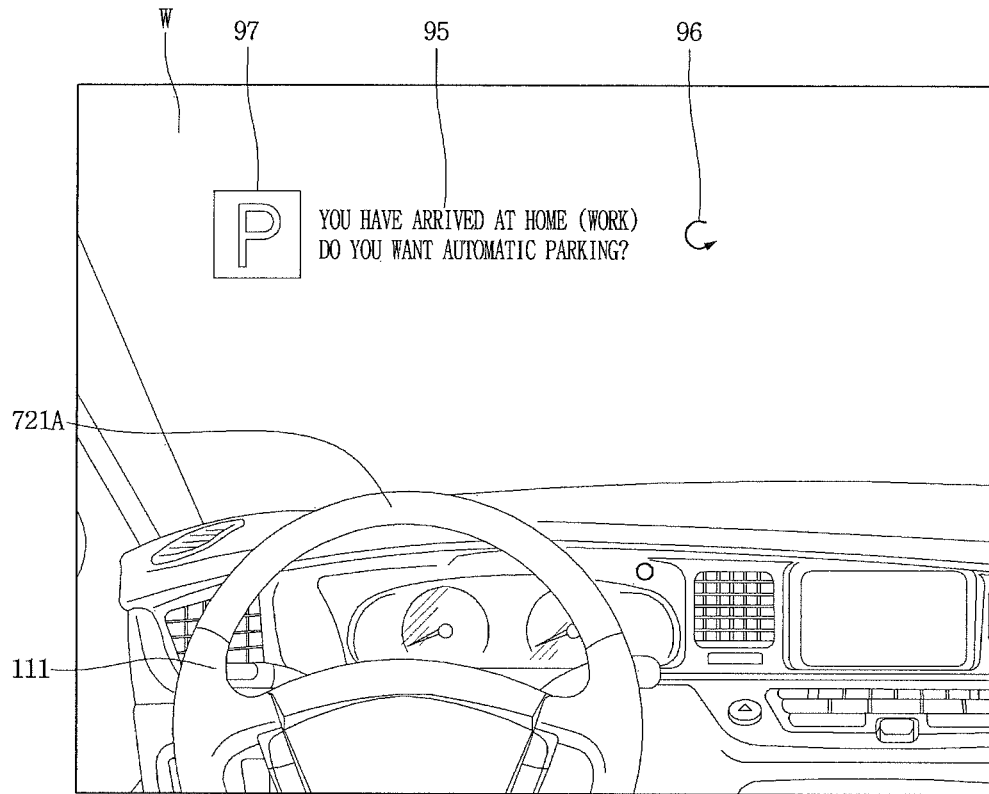
FIG. 27 is a diagram illustrating an example of a self-driving function in a driving state near a home or other location associated with a user.

FIG. 27 represents how to propose a automatic driving function in the driving state near a home or other location associated with a user, such as within a threshold distance of a home.

The processor 170 may receive at least one of navigation information, image information and sensor information and detect the driving state of the vehicle 700 from the received information.

For example, the processor 170 may detect through the navigation, driving history information, and so on that a user drives near a home of the user, such as within a threshold distance of the home.

In addition, the processor 170 may display the extracted self-driving function through the display unit 180 so that the user may recognize the function.

Referring to FIG. 27, it is possible to control the first display unit 181 to display an arrow 75 that represents a self-driving function.

Also, when the user selects the self-driving function, the processor 170 may notify the user of the details 95 of the self-driving function and provide a method of inputting whether to execute the function.

Also, the processor 170 may output the detail of the self-driving function through sound from the audio output unit 185.

In addition, the processor 170 may enable an input method 96 of executing the displayed self-driving function to be further displayed.

In addition, when the user performs the displayed self-driving function execution input method, the processor 170 may receive it from the input unit 110 to perform a corresponding self-driving function.

For example, when the user performs a twisting input, the processor 170 may execute a self-driving function to relay, to the vehicle 700, a self-driving execution input of automatically parking the vehicle 700.

In summary, the user may receive, through the driver assistance apparatus 100, a proposal to perform the self-driving function of automatically parking through a pop-up window during driving, and enable the vehicle 700 to perform self-driving by a single input of a twisting gesture so that the vehicle is automatically parked.

Figure 28:
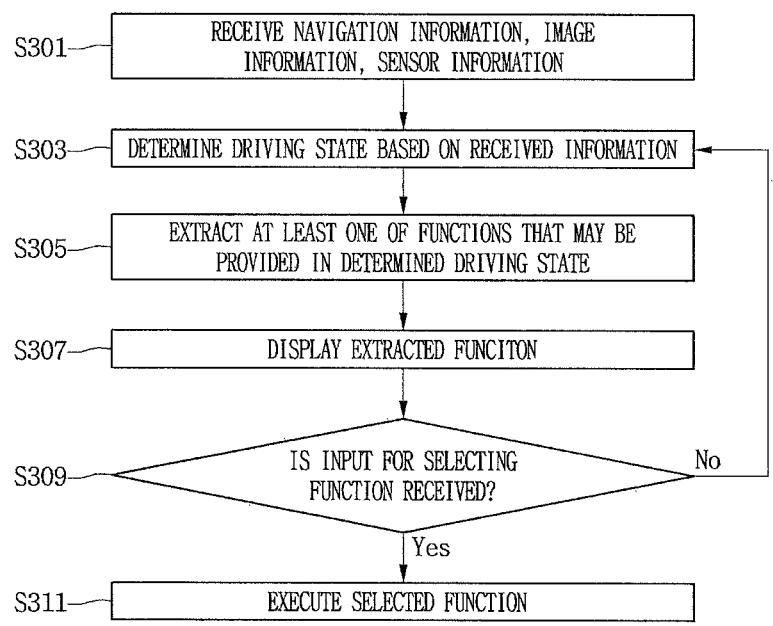
FIG. 28 is a flowchart illustrating an example of a process of providing and executing, by a driver assistance apparatus, various functions depending on a situation according to a second implementation.
Figure 29:
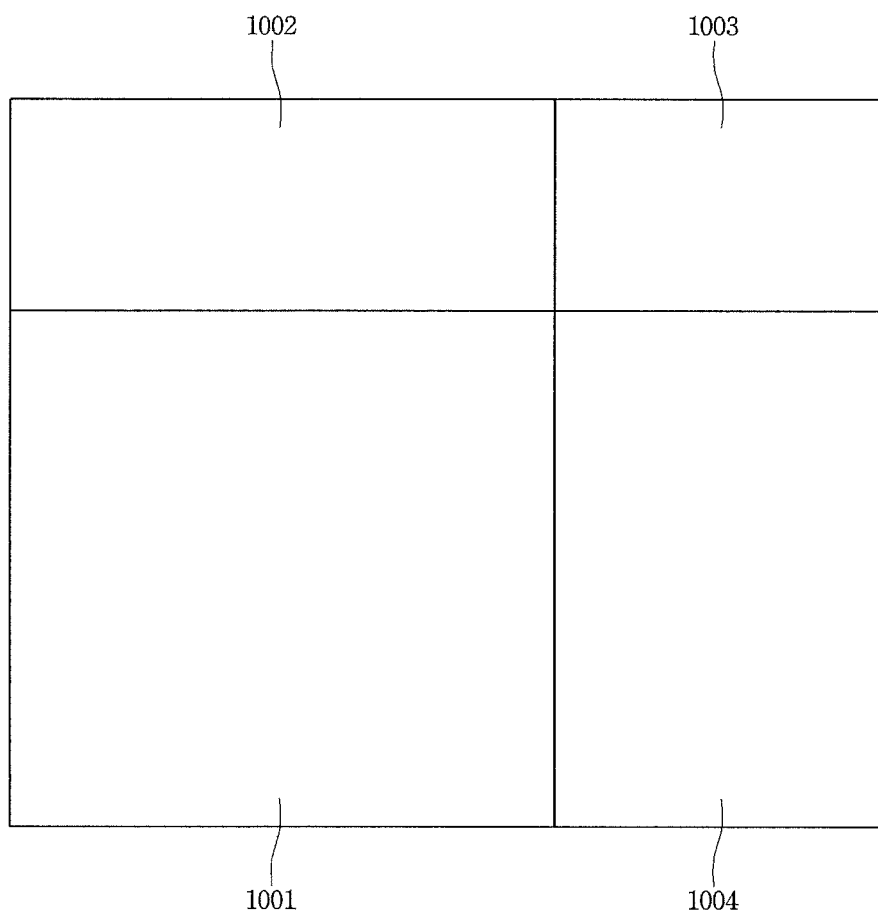
FIG. 29 is a diagram illustrating an example of a screen of a first display unit.
Figure 30:
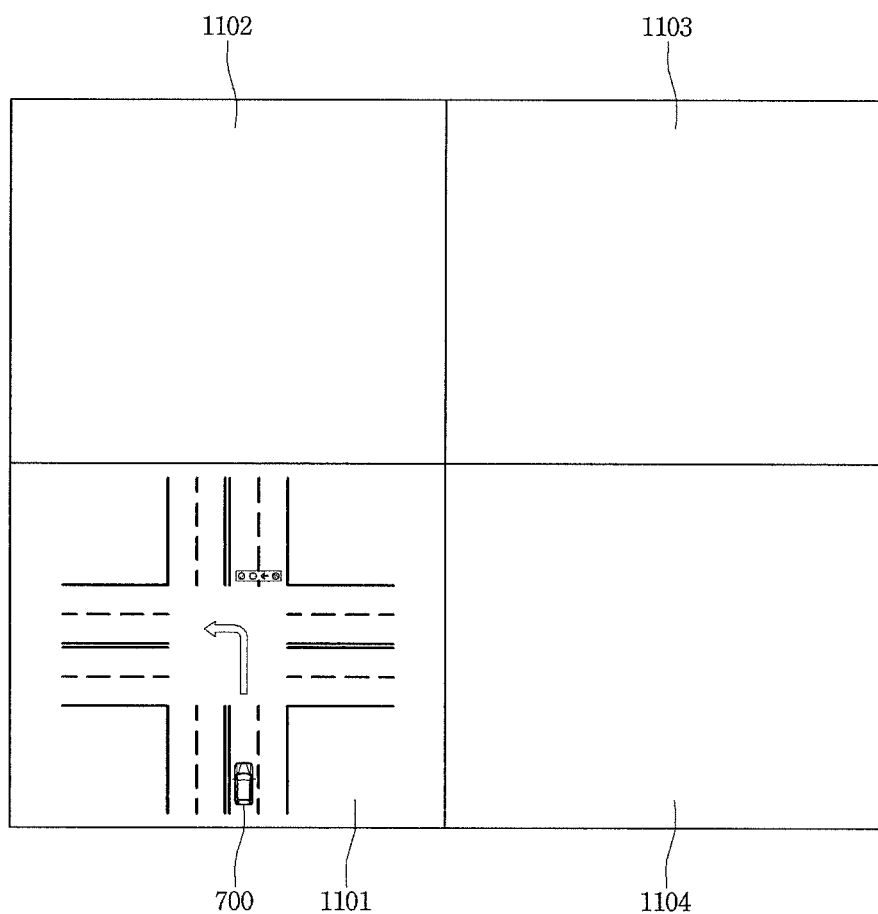
FIG. 30 is a diagram illustrating an example of a screen of a second display unit.

FIG. 28 is a flowchart of a process of providing and executing, by the driver assistance apparatus 100 according to a second implementation, various functions depending on the situation. FIG. 29 represents the screen of a first display unit. FIG. 30 represents the screen of a second display unit. In the following, the second implementation is described centered around differences from the above-described implementation, and repetitive descriptions are omitted.

The driver assistance apparatus 100 may propose a recommended self-driving function and the convenience/safety function of the vehicle 700 depending on the driving state. For example, the driver assistance apparatus 100 according to the second implementation may display various convenience/safety functions through a pop-up window depending on the driving situation, and execute a convenience/safety function according to a driver selection.

As a specific example, referring to FIG. 28, the processor 170 of the driver assistance apparatus 100 may receive at least one of navigation information, image information, or sensor information in step S301.

The processor 170 may receive the navigation information through the interface unit 130 and/or the communication unit 120. Also, the processor 170 may receive the sensor information through the interface unit 130. Also, the image information may be information that is generated by processing, by the processor 170, an image captured by the camera 160.

After receiving information, the processor 170 may detect the driving state of the vehicle 700 from at least one of the navigation information, image information, sensor information, and driving history information in step S303. For example, the processor 170 may detect that the vehicle 700 is in a traffic jam. Such traffic jam information may be detected, for example, based on traffic information in the navigation information for the vehicle 700, and/or based on detecting a preceding vehicle in front of the vehicle 700 in the image information, and/or based on speed information in the sensor information.

As another example, the processor 170 may detect that the user drives on the hill, through vehicle 700 tilt information in the sensor information, road information in the navigation information, a lane state in the image information, and so on.

As another example, the processor 170 may detect that the user drives on a rough or unpaved road, through shake information in the sensor information, road information in the navigation information, a road state in the image information, and so on.

As another example, the processor 170 may detect that the vehicle experiences lack of fuel, through fuel information in the sensor information, and route information in the navigation information.

As another example, the processor 170 may detect brightness information from the image information to detect that the user drives at night or in the daytime.

As another example, the processor 170 may detect that the user drives in the rain, through humidity information in the sensor information, and the image information.

As another example, the processor 170 may detect that the user drives on a curve, through route information in the navigation information, heading, yaw and gyro sensor information in the sensor information, and a lane state in the image information.

As another example, the processor 170 may detect when the user gets in, through the sensor information and the monitoring unit 150.

As another example, the processor 170 may detect that the vehicle is being parked, through route information in the navigation information, and parking lot sign information in the image information.

As another example, the processor 170 may detect when the user gets out of the vehicle 700, through destination information in the navigation information.

Based on one or more of the examples described above, the processor 170 may extract at least one convenience/safety function that may be provided in the detected driving state, in step S305. There may various convenience/safety functions that are determined to be appropriate for the scenarios described above.

As an example of a convenience/safety function, the processor 170 may extract an idle stop and go (ISG) function, a route re-search function and an auto-hold function, when the vehicle is in a traffic jam.

As another example of a convenience/safety function, the processor 170 may extract a hill start assist (HAS) function, a transparent bonnet function, and a four-wheel function, when the user drives on the hill.

As another example of a convenience/safety function, the processor 170 may extract a suspension function, a tire check function and a road width information providing function, when the user drives on a rough or unpaved road.

As another example of a convenience/safety function, the processor 170 may extract an ECO function, a gas station search function and a driving range providing function, when the user experiences lack of fuel.

As another example of a convenience/safety function, the processor 170 may extract a cooling set operation function, a sunroof open/close function, and a sunlight blocking function, when the user drives in the daytime.

As another example of a convenience/safety function, the processor 170 may extract an infrared camera 160 function and a lighting function, when the user drives at night.

As another example of a convenience/safety function, the processor 170 may extract a windshield wiper function, a sunroof open/close function, and a four-wheel function, when the user drives in the rain.

As another example of a convenience/safety function, the processor 170 may extract an electronic stability control (ESC) function, and a lane departure warning system (LDWS) function, when the user drives on a curve.

As another example of a convenience/safety function, the processor 170 may extract a window open/close function, an air-conditioning function, and a lighting function, when the user drives in the tunnel.

As another example of a convenience/safety function, the processor may extract a seat adjusting function, a navigation setting function, and a door lock function, when the user gets in.

As another example of a convenience/safety function, the processor 170 may extract a parking assist system (PAS) function, an around view monitoring (AVM) function, and an ultrasonic alarm function, when the user is parking.

As another example of a convenience/safety function, the processor 170 may extract a door unlocking function, a lighting function, and a window open/close function when it is recognized through destination information in the navigation information that it is time to get off the vehicle 700.

After the processor 170 has determined an appropriate convenience/safety function to recommend to the user based on the determined driving state of the vehicle, the processor 170 may display the extracted convenience/safety functions through the display unit 180 so that the user may recognize the functions, in step S307.

The processor 170 may split the screen of the display unit 180 to display a plurality of images to display the extracted convenience/safety function.

Specifically, the display unit 180 may be split into two or more regions to display the extracted convenience/safety function and a typical display screen together.

For example, referring to FIG. 29, the first display unit 181 of the display unit 180 may be split into first to fourth regions 1001 to 1004. In addition, an image may not be displayed on the first region 1001. That is, the user may see the front through the first region 1001.

In addition, the extracted functions may be displayed on the second to fourth regions 1002 to 1004, respectively. That is, the extracted functions may be displayed as projected images on regions that have little effect on forward view.

For example, in a traffic jam, the first display unit 171 may display an ISG function on the second region 1002, a route re-search function on the third region 1003, and an auto-hold function as a projected image on the fourth region 1004. That is, the second display unit 183 may display extracted functions as projected images on external regions without blocking a driver's front view.

Also, referring to FIG. 30, the second display unit 183 of the display unit 180 may be split into first to fourth regions 1101 to 1104. In addition, a typical display image may be displayed on the first region 1001. For example, a road information providing image may be displayed on the first region 1101.

In addition, the extracted functions may be displayed on the second to fourth regions 1102 to 1104, respectively. That is, the extracted functions may be displayed on regions that have little effect on forward view.

For example, in a traffic jam, the first display unit 181 may display an ISG function on the second region 1102, a route re-search function on the third region 1103, and an auto-hold function on the fourth region 1104.

Next, the processor 170 may receive an input of selecting whether to execute the convenience/safety function.

The processor 170 may receive a user input relating to whether to execute the convenience/safety function, through the input unit 110.

For example, when the first display unit 181 is used for a display, the convenience/safety function execution input unit may be the gesture input unit 111 that is disposed at the steering input unit 721A. In addition, the processor 170 may sense a gesture sensed from the gesture input unit 111 and perform an operation corresponding to the sensed gesture.

For example, when a gesture of fixing a left hand and then swiping a right hand clockwise is sensed through the gesture input unit 111, the processor 170 may perform an operation of executing the operation of executing the convenience/safety function matching a corresponding gesture. That is, the processor 170 may request the control unit of the vehicle 700 to execute the convenience/safety function of passing an express tollgate lane.

Also, when the second display unit 183 is used for a display, the convenience/safety function execution input unit may be the gesture input unit 113 that is disposed at the second display unit 183. That is, the second display unit 183 may be a touch screen that is coupled to the gesture input unit 113

Specifically, the screen of the second display unit 183 may be split, functions may be displayed on the split regions, and corresponding functions may be executed when the split regions are touched.

As such, since the method of providing the convenience/safety function as described above may be easily executed while maintain driving attention, and properly provides necessary functions according to driving, there is an advantage in that it is possible to increase the convenience of the driver.

Figure 31:
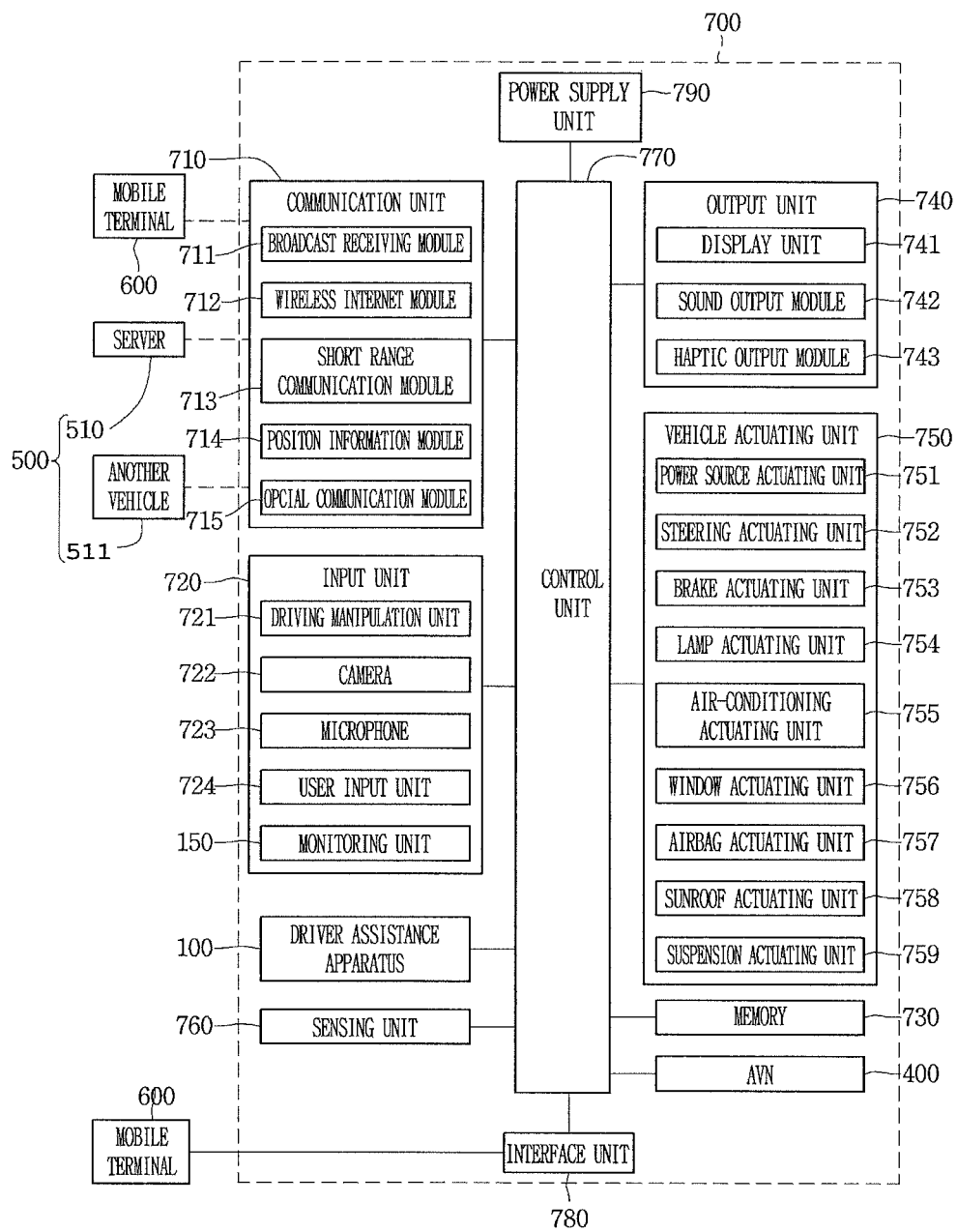
FIG. 31 is a diagram illustrating an example of an internal block diagram of a vehicle that includes a driver assistance apparatus.

FIG. 31 is an example of an internal block diagram of the vehicle of FIG. 1.

Such a driver assistance apparatus may be included in the vehicle 700.

The vehicle may include a communication unit 710, an input unit 720, a sensor unit 760, an output unit 740, a vehicle actuating unit 750, a memory 730, an interface unit 780, a control unit 770, a power supply unit 790, a driver assistance apparatus 100, and an AVN apparatus 400.

The communication unit 710 may include one or more modules that enable wireless communication between the vehicle and the mobile terminal 600, and/or between the vehicle 700 and a server 500. The server 500 may be an external sever 510 or a computer 511 in another vehicle. Also, the communication unit 710 may include one or more modules that connect the vehicle to one or more networks.

The communication unit 710 may include a broadcast receiving module 711, a wireless internet module 712, a short-range communication module 713, a position information module 714, and an optical communication module 715.

The broadcast receiving module 711 receives a broadcast signal or broadcast related information from an external broadcast management server through a broadcast channel. In this example, a broadcast include a radio or TV broadcast.

The wireless internet module 712 indicates a module for wireless internet access and may be built into or external to the vehicle. The wireless internet module 712 is configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 712 transmits/receives data according to at least one wireless internet technology including internet technologies not listed above. For example, the wireless internet module 712 may exchange data with the external server 510 wirelessly. The wireless internet module 712 may receive weather information or road traffic information (e.g., TPEG) from the external server 510.

The short-range communication module 713 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

Such a short-range communication module 713 may form a Wireless Area Network (WAN) to perform short-range communication between the vehicle and at least one external device. For example, the short-range communication module 713 may exchange data with the mobile terminal 600. The short-range communication module 713 may receive weather information or road traffic information (e.g., TPEG) from the mobile terminal 600. If a user gets in the vehicle, the mobile terminal 600 of the user and the vehicle may perform pairing on each other automatically or by the execution of an application by the user.

The position information module 714 is a module for acquiring the position of the vehicle and includes a GPS module as a typical example. For example, the vehicle may use a signal transmitted by a GPS satellite to acquire the position of the vehicle, when the GPS module is used.

The optical communication module 715 may include a light transmission unit and a light reception unit.

The light reception unit may convert a light signal into an electrical signal to receive information. The light reception unit may include a photo diode (PD) for receiving light. The PD may convert light into an electrical signal. For example, the light reception unit may receive information on the front vehicle through light emitted from a light source that is included in the front vehicle.

The light transmission unit may include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency. According to an implementation, the light transmission unit may include a plurality of light-emitting element arrays. According to an implementation, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the computer 511 in another vehicle through optical communication.

The input unit 720 may include the driving manipulation unit 721, a camera 195, a microphone 723, and a user input unit 724.

The driving manipulation unit 721 receives a user input for driving the vehicle. (See FIG. 2 for the following description.) The driving manipulation unit 721 may include the steering input unit 721A, a shift input unit 721D, an acceleration input unit 721C, and a brake input unit 721B.

The steering input unit 721A receives an input for the driving direction of the vehicle from a user. The steering input unit 721A may be formed in the form of a wheel so that a steering input may be performed by rotation. According to an implementation, the steering input unit 721A may also be formed as a touch screen, touch pad or button.

The shift input unit 721D receives an input for the parking P, driving D, neutrality N, and rear movement R of the vehicle from the user. The shift input unit 721D may be formed in the form of a lever. According to an implementation, the shift input unit 721D may also be formed as a touch screen, touch pad or button.

The acceleration input unit 721C receives an input for the acceleration of the vehicle from the user. The brake input unit 721B receives an input for the speed decrease of the vehicle from the user. The acceleration input unit 721C and the brake input unit 721B may be formed in the form of a pedal. According to an implementation, the acceleration input unit 721C or the brake input unit 721B may also be formed as a touch screen, touch pad or button.

The camera 722 may include an image sensor and an image processing module. The camera 722 may process a still image or video that is obtained by an image sensor (e.g., CMOS or CCD). The image processing module may process the still image or video acquired by the image sensor to extract necessary information and transmit the extracted information to the control unit 770. The vehicle may include the camera 722 that captures images in front of the vehicle or images around the vehicle, and the monitoring unit 150 that captures an image of the interior of the vehicle.

The monitoring unit 150 may acquire an image of a passenger. The monitoring unit 150 may acquire the image of the passenger for biometrics.

Although FIG. 31 shows that the monitoring unit 150 and the camera 722 are included in the input unit, the camera 722 may also be included in the driver assistance apparatus as described above.

The microphone 723 may process an external sound signal into electrical data. The processed data may be used in various methods according to a function that is executed at the vehicle. The microphone 723 may convert a user's voice command into electrical data. The electrical data obtained through conversion may be transmitted to the control unit 770.

According to an implementation, the camera 722 or the microphone 723 may also be a component that is included in the sensing unit 760, and not in the input unit 720.

The user input unit 724 receives information from the user. When information is input through the user input unit 724, the control unit 770 may control the operation of the vehicle corresponding to the input information. The user input unit 724 may include a touch-type input unit or mechanical input unit. According to an implementation, the user input unit 724 may be disposed at a region of a steering wheel. In this case, a driver may manipulate the user input unit 724 with his or her finger, holding the steering wheel.

The sensing unit 760 senses a signal relating to the driving of the vehicle. To this end, the sensing unit 760 may include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor by steering wheel rotation, a vehicle temperature sensor, a vehicle humidity sensor, an ultrasonic sensor, a radar, a Lidar, and so on.

Thus, the sensing unit 760 may acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on.

The sensing unit 760 may include a biometric recognition information sensing unit. The biometric recognition information sensing unit senses and acquires biometric recognition information on a passenger. The biometric recognition information may include fingerprint information, iris-scan information, retina-scan information, hand geometry information, facial recognition information, and voice recognition information. The biometric recognition information sensing unit may include a sensor that senses biometric recognition information of the passenger. In this case, the monitoring unit 150 and the microphone 723 may operate as sensors. The biometric recognition information sensing unit may acquire hand geometry information and facial recognition information through the monitoring unit 150.

The output unit 740 is used for outputting information processed by the control unit 770 and may include the display unit 741, the sound output unit 742, and the haptic output unit 743.

The display unit 741 may display information processed by the control unit 770. For example, the display unit 741 may display vehicle related information. In this example, the vehicle related information may include vehicle control information for direct control over the vehicle or driver assistance information for a driving guide for a driver. Also, the vehicle related information may include vehicle state information that indicates the current state of the vehicle, or vehicle operation information relating to the operation of the vehicle.

The display unit 741 may include at least one of an LCD, a TFT LCD, an OLED, a flexible display, a 3D display, and an e-ink display.

The display unit 741 may form a mutual layer structure with a touch sensor or be integrally formed to implement a touch screen. The touch screen may function as the user input unit that provides an input interface between the vehicle and the user, and also provide an output interface between the vehicle and the user. In this case, the display unit 741 may include a touch sensor sensing a touch of the display unit 741 to be capable of receiving a control command by the touch. Accordingly, when the display unit 741 is touched, the touch sensor senses the touch, and the control unit 770 may generate, based on the touch, a control command corresponding to the touch. A thing input by the touch may be a letter, a number, or a menu item that may be instructed or designated in various modes.

The display unit 741 may include a cluster so that a driver may see vehicle state information or vehicle operation information simultaneously with driving. The cluster may be located on the dashboard. In this case, the driver may see information displayed on the cluster, maintaining forward view.

According to an implementation, the display unit 741 may be implemented as a HUD. When the display unit 741 is implemented as the HUD, it is possible to output information through a transparent display that is installed on the windshield. Alternatively, the display unit 741 may include a projection module to output information by using image that is projected onto the windshield.

The sound output unit 742 converts an electrical signal from the control unit 770 into an audio signal and outputs the audio signal. To this end, the sound output unit 742 may include a speaker and so on. The sound output unit 742 may also output sound corresponding to the operation of the user input unit 724.

The haptic output unit 743 generates a haptic output. For example, the haptic output unit 743 may enable a steering wheel, a safety belt and a seat to vibrate so that a user may recognize an output.

The vehicle actuating unit 750 may control the operations of various apparatuses of the vehicle. The vehicle actuating unit 750 may include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle.

For example, when the power source is a fossil fuel based engine (not shown), the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor (not shown), the power source actuating unit 751 may control the motor. Thus, it is possible to control the speed, torque and so on of the motor.

The steering actuating unit 752 may perform electronic control over a steering apparatus in the vehicle. Thus, it is possible to change the driving direction of the vehicle.

The brake actuating unit 753 may perform electronic control over a brake apparatus (not shown) in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on.

The air-conditioning actuating unit 755 may perform electronic control over an air conditioner (not shown) in the vehicle. For example, when the temperature inside the vehicle is high, it is possible to operate the air conditioner so that cold air is supplied into the vehicle.

The window actuating unit 756 may perform electronic control over a window apparatus in the vehicle. For example, it is possible to open or close left and right windows of the vehicle.

The airbag actuating unit 757 may perform electronic control over an airbag apparatus in the vehicle. For example, it is possible to operate an airbag in a risky situation.

The sunroof actuating unit 758 may perform electronic control over a sunroof apparatus (not shown) in the vehicle. For example, it is possible to open or close the sunroof.

The suspension actuating unit 759 may perform electronic control over a suspension apparatus (not shown) in the vehicle. For example, when the road surface is uneven, it is possible to control a suspension apparatus to reduce the vibration of the vehicle.

The memory 730 is electrically connected to the control unit 770. The memory 730 may store fundamental data on units, control data for operation control over the units, and input and output data. The memory 730 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface 780 may function as a path to various kinds of external devices that are connected to the vehicle. For example, the interface unit 780 may include a port connectable to the mobile terminal 600 and be connected to the mobile terminal 600 through the port. In this case, the interface unit 780 may exchange data with the mobile terminal 600.

The interface unit 780 may function as a path through which electrical energy is supplied to the mobile terminal 600. When the mobile terminal 600 is electrically connected to the interface unit 780, the interface unit 780 supplies electrical energy supplied from the power supply unit 790 to the mobile terminal 600 according to the control of the control unit 770.

The control unit 770 may control the overall operation of each unit in the vehicle. The control unit 770 may be named an electronic control unit (ECU).

Such a control unit 770 may execute a function corresponding to a transmitted signal, according to the execution signal transmission of the driver assistance apparatus 100.

The control unit 770 may be implemented by using at least one of an ASIC, a DSP, a DSPD, a PLD, an FPGA, a processor, a controller, a micro-controller, a microprocessor, and other electrical units for executing functions.

The control unit 770 may perform the role of the above-described processor 170. That is, the processor 170 of the driver assistance apparatus 100 may be set directly to the control unit 770 of the vehicle. In such an implementation, it may be understood that the driver assistance apparatus 100 refers to some components of the vehicle.

Alternatively, the control unit 770 may also control components to transmit information requested by the processor 170.

The power supply unit 790 may supply power required for the operation of each component according to the control of the control unit 770. In particular, the power supply unit 790 may receive power from a battery (not shown) in the vehicle.

The AVN apparatus 400 may exchange data with the control unit 770. The control unit 770 may receive navigation information from the AVN apparatus 400 or a separate navigation apparatus (not shown). In this example, the navigation information may include set destination information, route information according to the destination, vehicle driving related map information, or vehicle position information.

Since the driver assistance apparatus according to an implementation proposes a function necessary for a user depending on a driving situation, maintain user's driving attention, and may be easily performed, there are advantages in that safe driving is possible and it is possible to increase the convenience of the driver.

Specifically, the driver assistance apparatus according to an implementation may enhance driving safety by providing a self-driving function of performing special driving that a user has a difficulty.

Also, since the driver assistance apparatus according to an implementation may receive an execution input through a gesture input unit, a user may easily perform various execution inputs, maintaining driving attention.

Also, the driver assistance apparatus according to an implementation proposes a necessary function through a display unit, in which case the driver assistance apparatus enables a convenience function to be intuitively understood with a simple display and also enhances driving safety because the user may keep eyes forward.

The characteristics, structures, and effects described in the implementations above are included in at least one implementation but are not limited to one implementation. Furthermore, the characteristic, structure, and effect illustrated in each implementation may be combined or modified for other implementations by a person skilled in the art. Thus, it would be construed that contents related to such a combination and such a variation are included in the scope of implementations.

Implementations are mostly described above. However, they are only examples and do not limit the inventive concept. A person skilled in the art may appreciate that many variations and applications not presented above may be implemented without departing from the essential characteristic of implementations. For example, each component particularly represented in implementations may be varied.

In addition, it should be construed that differences related to such a variation and such an application are included in the scope of the inventive concept defined in the following claims.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A driver assistance apparatus for a vehicle having a self-driving function, the driver assistance apparatus comprising:
   a processor configured to:
      determine at least one of navigation information, image information, or sensor information for the vehicle;
      detect a driving state of the vehicle based on the determined at least one of navigation information, image information, or sensor information; and
      determine a self-driving function of the vehicle that is appropriate for the detected driving state of the vehicle; and
   a display unit configured to display the self-driving function that is determined to be appropriate for the detected driving state of the vehicle.

2. The driver assistance apparatus according to claim 1, wherein:
   the processor is configured to determine navigation information and sensor information for the vehicle, and detect the driving state of the vehicle based on the navigation information and the sensor information,
   the navigation information comprises at least one of vehicle driving related map information, position information, set destination information, or route information according to the destination, the sensor information comprises at least one of direction information, position information, speed information, acceleration information, tilt information, forward/backward movement information, fuel information, or lamp information for the vehicle, and the driver assistance apparatus further comprises an interface unit configured to receive the navigation information and the sensor information.

3. The driver assistance apparatus according to claim 2, wherein:
the processor is configured to further determine image information, and detect the driving state of the vehicle further based on the image information,
the image information comprises an image of at least one of a view in front of the vehicle or a view around the vehicle,
the driver assistance apparatus further comprises at least one camera configured to capture the image of the at least one of a view in front of the vehicle or a view around the vehicle, and
the processor is configured to acquire the image information based on the captured image by processing the captured image to detect at least one of a signal light, a sign, or a road surface as the image information.

4. The driver assistance apparatus according to claim 1, wherein the display unit is configured to display an icon corresponding to the determined self-driving function.

5. The driver assistance apparatus according to claim 4, wherein the display unit comprises a head-up display of a windshield and is configured to display the icon as an augmented reality image that corresponds to an image projected on the windshield.

6. The driver assistance apparatus according to claim 1, further comprising an input unit configured to receive, from a user:
an input that selects the self-driving function,
an input that executes the self-driving function, and
an input that cancels the self-driving function.

7. The driver assistance apparatus according to claim 6, wherein the input unit is a steering wheel configured to recognize a swiping gesture input and a twisting gesture input of the user.

8. The driver assistance apparatus according to claim 6, further comprising an audio output unit configured to output a sound that corresponds to the self-driving function based on a determination that the input that selects the self-driving function is received by the input unit.

9. The driver assistance apparatus according to claim 6, wherein the display unit is configured to display a text that corresponds to the self-driving function based on a determination that the input that selects the self-driving function is received by the input unit.

10. The driver assistance apparatus according to claim 2, wherein:
the processor is further configured to:
determine, based on the position information or the image information, that the vehicle approaches an express lane of a tollgate; and
determine the self-driving function as being a self-driving function for passing through the express lane of the tollgate,
wherein the display unit is further configured to display the self-driving function as being the self-driving function for passing through the express lane of the tollgate.

11. The driver assistance apparatus according to claim 10, further comprising an input unit configured to receive, from a user:
an input that selects the self-driving function,
an input that executes the self-driving function, and
an input that cancels the self-driving function,
wherein the processor is further configured to:
receive, from the input unit, a self-driving function execution input signal for passing through the express lane of the tollgate; and
perform, based on receiving the self-driving function execution input signal for passing through the express lane of the tollgate, a control function for the vehicle to perform self-driving until the vehicle passes through the express lane of the tollgate.

12. The driver assistance apparatus according to claim 2, wherein the processor is configured to:
determine, based on the position information or the image information, that the vehicle approaches a ramp way; and
determine the self-driving function as being a self-driving function for passing through the ramp way,
wherein the display unit is further configured to display the self-driving function as being the self-driving function for passing through the ramp way.

13. The driver assistance apparatus according to claim 12, further comprising an input unit configured to receive, from a user:
an input that selects the self-driving function,
an input that executes the self-driving function, and
an input that cancels the self-driving function,
wherein the processor is further configured to:
receive, from the input unit, a self-driving function execution input signal for passing through the ramp way; and
perform, based on receiving the self-driving function execution input signal for passing through the ramp way, a control function for the vehicle to perform self-driving until the vehicle passes through the ramp way.

14. The driver assistance apparatus according to claim 2, wherein the processor is further configured to:
determine, based on the position information or the image information, that the vehicle approaches a service area; and
determine the self-driving function as being a self-driving function for the vehicle to enter the service area,
wherein the display unit is further configured to display the self-driving function as being the self-driving function for entering the service area.

15. The driver assistance apparatus according to claim 14, further comprising an input unit configured to receive, from a user:
an input that selects the self-driving function,
an input that executes the self-driving function, and
an input that cancels the self-driving function,
wherein the processor is further configured to:
receive, from the input unit, a self-driving function execution input signal for entering the service area; and
perform, based on receiving the self-driving function execution input signal for entering the service area, a control function for the vehicle to perform self-driving until the vehicle arrives at the service area.

16. The driver assistance apparatus according to claim 2, wherein the processor is configured to:
determine, based on the position information or the image information, that the vehicle approaches or enters a section of a road in which self-driving is permitted; and determine the self-driving function as being a self-driving function for the vehicle to perform self-driving in the section of the road in which self-driving is permitted,
wherein the display unit is further configured to display the self-driving function as being the self-driving function for the vehicle to perform self-driving in the section of the road in which self-driving is permitted.

17. The driver assistance apparatus according to claim 16, further comprising an input unit configured to receive, from a user:
an input that selects the self-driving function,
an input that executes the self-driving function, and
an input that cancels the self-driving function,
wherein the processor is further configured to:
receive, from the input unit, a self-driving function execution input signal for the section of the road in which self-driving is permitted; and
perform, based on receiving the self-driving function execution input signal for the section of the road in which self-driving is permitted, a control function for the vehicle to perform self-driving in the section of the road in which self-driving is permitted.

18. The driver assistance apparatus according to claim 3, wherein the processor is further configured to:
determine, based on the position information and the image information, that the vehicle is in a U-turn lane or determine, based on the position information, that the vehicle approaches a U-turn lane along a navigation route; and
determine, based on either the determination that the vehicle is in the U-turn lane or the determination that the vehicle approaches the U-turn lane along the navigation route, the self-driving function as being a U-turn self-driving function for performing self-driving until the vehicle completes a U-turn,
wherein the display unit is further configured to display the self-driving function as being the U-turn self-driving function.

19. The driver assistance apparatus according to claim 18, further comprising an input unit configured to receive, from a user:
an input that selects the self-driving function,
an input that executes the self-driving function, and
an input that cancels the self-driving function,
wherein the processor is further configured to:
receive, from the input unit, a U-turn self-driving function execution input signal; and
perform, based on receiving the U-turn self-driving function execution input signal, a control function for the vehicle to perform self-driving until the vehicle has completed the U-turn.

20. The driver assistance apparatus according to claim 3, wherein the processor is configured to:
determine, based on the position information and the image information, that the vehicle approaches an intersection; and
determine the self-driving function as being a self-driving function for passing through the intersection according to route information,
wherein the display unit is further configured to display the self-driving function as being the self-driving function of passing through the intersection according to the route information.

21. The driver assistance apparatus according to claim 20, further comprising an input unit configured to receive, from a user:
an input that selects the self-driving function,
an input that executes the self-driving function, and
an input that cancels the self-driving function,
wherein the processor is further configured to:
receive, from the input unit, a self-driving function execution input signal for passing through the intersection; and
perform, based on receiving the self-driving function execution input signal for passing through the intersection, a control function for the vehicle to perform self-driving until the vehicle passes through the intersection.

22. The driver assistance apparatus according to claim 3, further comprising a communication unit configured to receive signal light change information from an external server,
wherein the processor is configured to determine, based on the image information and the signal light change information, the self-driving function as being a self-driving function for passing through a signal light, and
the display unit is configured to display the self-driving function of passing through the signal light.

23. The driver assistance apparatus according to claim 3, wherein the processor is further configured to:
determine, based on the position information and the image information, that the vehicle is travelling on a narrow road; and
determine the self-driving function as being a narrow road self-driving function for performing self-driving until the vehicle is out of the narrow road,
wherein the display unit is configured to display the self-driving function as being the narrow road self-driving function.

24. The driver assistance apparatus according to claim 3, wherein the processor is further configured to:
determine, based on the position information and the image information, that the vehicle enters a parking lot; and
determine the self-driving function as being a parking self-driving function for automatically parking the vehicle,
wherein the display unit is configured to display the self-driving function as being the parking self-driving function.

25. The driver assistance apparatus according to claim 3, wherein the processor is further configured to:
determine, based on the sensor information, that a turn signal has been input; and
determine the self-driving function as being a lane change self-driving function for moving the vehicle according to the turn signal,
wherein the display unit is configured to display the self-driving function as being the lane change self-driving function.

26. The driver assistance apparatus according to claim 3, wherein the processor is configured to:
determine, based on the image information, that a second vehicle travels in front of the vehicle for a preset duration of time; and
determine, based on the determination that the second vehicle travels in front of the vehicle for the preset duration of time, the self-driving function as being an overtaking self-driving function for performing self-driving until the vehicle overtakes the second vehicle,
wherein the display unit is further configured to display the self-driving function as being the overtaking self-driving function.

27. The driver assistance apparatus according to claim 1, wherein the processor is further configured to:
- determine driving history information stored in a memory;
- determine, based on the driving history information, a location in the driving history information that is associated with the user;
- detect that the vehicle travels within a threshold distance of the determined location in the driving history information that is associated with the user; and
- determine, based on detecting that the vehicle travels within a threshold distance of the location in the driving history information associated with the user, the self-driving function as being an automatic-parking self-driving function,
- wherein the display unit is configured to display the self-driving function as being an automatic-parking self-driving function.

28. The driver assistance apparatus according to claim 6, wherein the input unit comprises at least one of an audio input unit configured to receive a user input made with sound, or a touch screen of a mobile terminal.

29. A driver assistance apparatus comprising:
- a processor configured to:
  - determine at least one of navigation information, image information, or sensor information;
  - detect a driving state of a vehicle based on the determined at least one of the navigation information, the image information, or the sensor information; and
  - determine a convenience and safety function of the vehicle that is appropriate for the determined driving state of the vehicle; and
- a display unit configured to display the convenience and safety function that is determined to be appropriate for the detected driving state of the vehicle.

30. A vehicle comprising the driver assistance apparatus according to claim 1.

31. A vehicle comprising the driver assistance apparatus according to claim 29.

* * * * *